US009488255B2

(12) United States Patent
Ishizaki et al.

(10) Patent No.: US 9,488,255 B2
(45) Date of Patent: Nov. 8, 2016

(54) BALL SCREW, SEAL MATERIAL, AND SEAL STRUCTURE

(71) Applicant: NITTA CORPORATION, Osaka (JP)

(72) Inventors: Yoji Ishizaki, Nara (JP); Yoshiharu Kiyohara, Nara (JP); Kenichiro Aoki, Nara (JP); Katsuyuki Nakai, Nara (JP); Yasuhiro Aoki, Nara (JP); Toshihiko Kojima, Nara (JP); Mitsuhiro Yamada, Nara (JP); Takuya Taira, Nara (JP)

(73) Assignee: NITTA CORPORATION, Osaka (JP)

( * ) Notice: Subject to any disclaimer, the term of this patent is extended or adjusted under 35 U.S.C. 154(b) by 0 days.

(21) Appl. No.: 14/565,148

(22) Filed: Dec. 9, 2014

(65) Prior Publication Data

US 2015/0114156 A1 Apr. 30, 2015

Related U.S. Application Data

(63) Continuation of application No. PCT/JP2013/066662, filed on Jun. 18, 2013.

(30) Foreign Application Priority Data

Jun. 22, 2012 (JP) .................... 2012-141417
Feb. 15, 2013 (JP) .................... 2013-027412
Mar. 26, 2013 (JP) .................... 2013-064485

(51) Int. Cl.
*F16H 25/22* (2006.01)
*F16J 15/32* (2016.01)
(Continued)

(52) U.S. Cl.
CPC ...... *F16H 25/2214* (2013.01); *F16H 25/2418* (2013.01); *F16J 15/168* (2013.01);
(Continued)

(58) Field of Classification Search
CPC ................. Y10T 74/19749; F16H 25/2214; F16H 25/2418; F16H 25/2204; F16J 15/168
See application file for complete search history.

(56) References Cited

U.S. PATENT DOCUMENTS 4,407,511 A * 10/1983 Benton ............... F16H 25/2418
277/354
4,905,533 A * 3/1990 Benton ............... F16H 25/2418
277/354

(Continued)

FOREIGN PATENT DOCUMENTS

JP 50-67252 U 10/1973
JP 53-47476 U 4/1978

(Continued)

OTHER PUBLICATIONS

Office Action mailed Sep. 29, 2015, in Japanese Application No. 2012-141417, filed Jun. 22, 2012, 6 pages.
(Continued)

*Primary Examiner* — David M Fenstermacher
(74) *Attorney, Agent, or Firm* — Seed IP Law Group LLP

(57) ABSTRACT

A ball screw including: a male component having male grooves on an outer periphery for a ball to roll; a female component fitted together with the male component in an axial direction having female grooves facing the male grooves on an inner periphery for the ball to roll and a circulation path for the ball to circulate; and a seal member at one end, at the other end, or at each of one and the other ends of the female component in the axial direction and including a hole capable of communicating with the inner periphery, a fiber layer having a fitting surface having a convex part capable of being fitted in the male grooves when the male component is inserted into the hole and a surface made of fibers impregnated with rubber or resin, and a rubber or resin layer laminated on a surface opposite to the fitting surface.

17 Claims, 15 Drawing Sheets

(51) Int. Cl.
*F16H 25/24* (2006.01)
*F16J 15/16* (2006.01)

(52) U.S. Cl.
CPC ......... *F16J15/3204* (2013.01); *F16J 15/3288* (2013.01); *F16H 25/2204* (2013.01); *Y10T 74/19749* (2015.01)

(56) References Cited

U.S. PATENT DOCUMENTS

| | | | | |
|---|---|---|---|---|
| 5,029,877 | A * | 7/1991 | Fedeli | F16H 25/2418 277/354 |
| 5,178,029 | A * | 1/1993 | Klinkenberg | F16H 25/2418 74/89.4 |
| 5,555,771 | A * | 9/1996 | Kuroiwa | F16B 19/004 277/354 |
| 5,722,294 | A * | 3/1998 | Kobayashi | F16H 25/2418 277/500 |
| 6,571,653 | B1 * | 6/2003 | Takeda | F16H 25/2418 277/354 |
| 7,278,333 | B2 * | 10/2007 | Kato | F16H 25/2204 184/5 |
| 8,511,896 | B2 * | 8/2013 | Shirai | F16H 25/2204 384/15 |

FOREIGN PATENT DOCUMENTS

| | | |
|---|---|---|
| JP | 58-163867 A | 9/1983 |
| JP | 1275953 A | 11/1989 |
| JP | 6-201013 A | 7/1994 |
| JP | 6-240271 A | 8/1994 |
| JP | 7-179846 A | 7/1995 |
| JP | 2000161462 A | 6/2000 |
| JP | 2001-304420 A | 10/2001 |
| JP | 2001304372 A | 10/2001 |
| JP | 2004-278594 A | 10/2004 |
| JP | 2007303523 A | 11/2007 |
| JP | 2008298166 A | 12/2008 |

OTHER PUBLICATIONS

Office Action from Japanese Application No. 2012-141417, dated Mar. 29, 2016.
Office Action mailed Jun. 1, 2016, in Chinese Patent Application No. 201380031428.6, 17 pages.

* cited by examiner

BALL SCREW, SEAL MATERIAL, AND SEAL STRUCTURE

BACKGROUND

1. Technical Field

The present invention relates to a ball screw used for various industrial machines as well as a seal member and a seal structure applicable to the ball screw.

2. Description of the Related Art

Conventionally, there have been publicly well-known ball screw devices each having a ball screw shaft and a ball nut fitted on an outer periphery of the ball screw shaft, and each including: a lip-type seal member having a lip part elastically contacting a periphery of the ball screw shaft at an end of the ball nut; and a cylindrically-shaped wiper-type seal member having a convex part on an inner periphery thereof, which convex part is fitted in grooves of the ball screw shaft such that the cylindrically-shaped wiper-type seal member is fitted on an outer periphery of the ball screw shaft on an outer side of the lip-type seal member in an axial direction (see Patent Document 1). Such a ball screw device including the lip-type seal member and the wire-type seal member used in a combined manner is configured such that foreign substances in the form of fine particles are prevented from entering between the ball screw shaft and the ball nut.

Meanwhile, there have been publicly well-known seal members each formed into the same in shape as the outer periphery of the ball screw shaft (see Patent Document 2). Such seal members are configured such that thin slide rings each made of synthetic resin are set on the outer periphery of the ball screw shaft, and that outer peripheries of the slide rings are tightened by back-up rings each made of synthetic rubber for the purpose of reduction of sliding resistance when fitting the ball screw shaft in the seal members.

PRIOR ART DOCUMENTS

Patent Documents

Patent Document 1: Japanese Patent Application Publication No. 2001-304372
Patent Document 2: Japanese Patent Application Publication No. H01-275953

Problems to be Solved

The ball screw device disclosed in Patent Document 1 can reduce the entry of foreign substances between the ball screw shaft and the ball nut with the lip-type seal members and the wiper-type seal members used in a combined manner; nevertheless, there has been a problem that, when fitting the ball screw shaft in the seal members, the slidability therebetween deteriorates due to increase in sliding resistance therebetween.

Furthermore, there has been a problem that seal members disclosed in Patent Document 2 have difficulties in evenly conforming the slide rings to the outer periphery of the ball screw shaft due to non-contractility of the synthetic resin, and that, when fitting the ball screw shaft in the seal members, the slidability therebetween deteriorates due to increase in sliding resistance therebetween caused by tightening with back-up rings made of synthetic rubber even if the synthetic resin with high slidability is used.

BRIEF SUMMARY

The objective of the present invention is to provide a ball screw, a seal member, and a seal structure for capable of effectively reducing the entry of fine foreign substances between male and female components while capable of decreasing the sliding resistance between the male component and the seal member when fitting the male component in the seal member.

Means for Solving Problems

[1] A ball screw according to the present invention is characterized by comprising: a male component having a plurality of male grooves formed on an outer periphery thereof such that a ball is allowed to roll in the plurality of male grooves; a female component having a plurality of female grooves facing the plurality of male grooves formed on an inner periphery thereof such that the ball is allowed to roll in the plurality of female grooves, and having a circulation path formed therein such that the ball is allowed to circulate through the circulation path; and a seal member arranged at one end, at the other end, or at each of one and the other ends of the female component in an axial direction, wherein the male and female components are fitted together in the axial direction, and wherein the seal member includes a hole capable of communicating with the inner periphery of the female component, a fiber layer having a fitting surface formed with a convex part capable of being fitted in the plurality of male grooves of the male component when the male component is inserted into the hole, the fitting surface having at least a surface made of fibers impregnated with rubber or resin, and a rubber or resin layer laminated on a surface opposite to the fitting surface of the fiber layer.

According to the construction of [1] above, by virtue of making the fiber layer, which is fitted with the plurality of male grooves of the male component, of fibers impregnated with rubber or resin, the fibers can be strongly bonded with rubber or resin, thereby not only maintaining the shape of the convex part capable of being fitted in the plurality of male grooves of the fiber layer but also accomplishing simultaneously the reduction of the entry of fine foreign substances between the male and female components as well as the reduction of the sliding resistance therebetween when shifting the male and female components in a relative manner in an axial direction, both of which reductions are trade-off related to each other. Further, by laminating the rubber or resin layer for reinforcement on the surface of the fiber layer on a side opposite to a hole-formed side, the shape of the convex part of the fiber layer can be stabilized, and the deformation of the fiber layer as a whole when causing the ball screw to work can be reduced. Still further, by virtue of laminating such a rubber or resin layer, the fiber and rubber or resin layers can be stably fixed to the female component at one end or the other end thereof.

[2] Regarding another aspect, the ball screw according to the present invention is characterized by comprising: a male component having a plurality of male grooves formed on an outer periphery thereof such that a ball is allowed to roll in the plurality of male grooves; a female component having a plurality of female grooves facing the plurality of male grooves formed on an inner periphery thereof such that the ball is allowed to roll in the plurality of female grooves, and having a circulation path formed therein such that the ball is allowed to circulate through the circulation path; and a seal member arranged at one end, at the other end, or at each of one and the other ends of the female component in an axial direction, wherein the male and female components are fitted together in the axial direction, wherein the seal member includes a hole capable of communicating with the inner periphery of the female component, a fiber layer having a fitting surface formed with a convex part capable of being fitted in the plurality of male grooves of the male component when the male component is inserted into the hole, the fitting surface having at least a surface made of fibers impregnated with rubber or resin, and a rubber or resin layer laminated on a surface opposite to the fitting surface of the fiber layer, and wherein a length of the fitting surface in the axial direction is shorter than or equal to a pitch width (a distance between threads adjacent to each other as a part of the male component) of the plurality of male grooves of the male component.

According to the construction of [2] above, by virtue of making the fiber layer, which is fitted with the plurality of male grooves of the male component, of fibers impregnated with rubber or resin, the fibers can be strongly bonded with rubber or resin, thereby not only maintaining the shape of the convex part capable of being fitted in the plurality of male grooves of the fiber layer but also accomplishing simultaneously the reduction of the entry of fine foreign substances between the male and female components as well as the reduction of the sliding resistance therebetween when shifting the male and female components in a relative manner in an axial direction, both of which reductions are trade-off related to each other. Further, by laminating the rubber or resin layer for reinforcement on the surface of the fiber layer on a side opposite to a hole-formed side, the shape of the convex part of the fiber layer can be stabilized, and the deformation of the fiber layer as a whole when causing the ball screw to work can be reduced. Still further, by virtue of laminating such a rubber or resin layer, the fiber and rubber or resin layers can be stably fixed to the female component at one end or the other end thereof. Still further, by virtue of rendering the length of the fitting surface in the axial direction as being shorter than or equal to the pitch width of the plurality of male grooves of the male component, the seal member becomes less rigid so as to exhibit full flexibility, thereby promoting the fitting surface to follow the surface of the male component. As a result, the ball screw according to the present invention can ensure the improved sealing property by closing a gap between the seal member and the male component even when causing the ball screw to work.

[3] Regarding the ball screw according to [2] above, it is preferable that, at said one end, at said the other end, or at said each of one and the other ends of the female component in the axial direction, a plurality of seal members, as the seal member, are arranged coaxially in series in a continuous manner. A gap may be made between the seal members.

According to the construction of [3] above, the plurality of seal members as the seal member according to [2] above arranged coaxially in series in a continuous manner can achieve lower in rigidity than a single-piece seal member having the same fitting surface in length in an axial direction as the construction of [3] above. As a result, the slidability of the fitting surface is improved in comparison with that of the single-piece seal member. The seal members in the construction of [3] above are more flexible than the single-piece seal member, and therefore the fitting surface of the seal members in the construction of [3] above is promoted to follow the surface of the male component in comparison with the single-piece seal member. Furthermore, according to the construction of [3] above, the edges of the respective seal members (on the side contacting the male component) are configured such that dust and the like can be scraped off the surface of the male component. In other words, the seal members according to the construction of [3] above can reduce the entry of dust and the like into the ball screw to a greater degree than the single-piece seal member does.

[4] Regarding another aspect, the ball screw according to the present invention is characterized by comprising: a male component having a plurality of male grooves formed on an outer periphery thereof such that a ball is allowed to roll in the plurality of male grooves; a female component having a plurality of female grooves facing the plurality of male grooves formed on an inner periphery thereof such that the ball is allowed to roll in the plurality of female grooves, and having a circulation path formed therein such that the ball is allowed to circulate through the circulation path; and a seal member arranged at one end, at the other end, or at each of one and the other ends of the female component in an axial direction, wherein the male and female components are fitted together in the axial direction, and wherein the seal member includes a hole capable of communicating with the inner periphery of the female component, a fiber layer configured such that the fiber layer can be fitted with the plurality of male grooves of the male component when the male component is inserted into the hole, the fiber layer having at least one surface made of fibers impregnated with rubber or resin, a first rubber or resin layer laminated on a surface opposite to the at least one surface of the fiber layer, and a second rubber or resin layer of water and/or oil repellency laminated with a predetermined thickness on the at least one surface of the fiber layer.

According to the construction of [4] above, by virtue of the at least one surface of the fiber layer, which can be fitted with the plurality of male grooves of the male component when the male component is inserted into the hole, of fibers impregnated with rubber or resin, the fibers can be strongly bonded with rubber or resin, thereby not only maintaining the shape of the at least one surface of the fiber layer but also accomplishing simultaneously the reduction of the entry of fine foreign substances between the male and female components as well as the reduction of the sliding resistance therebetween when shifting the male and female components in a relative manner in an axial direction, both of which reductions are trade-off related to each other. Further, by laminating the rubber or resin layer for reinforcement on the surface of the fiber layer on a side opposite to a hole-formed side, the shape of the convex part of the fiber layer can be stabilized, and the deformation of the fiber layer as a whole when causing the ball screw to work can be reduced. Still further, by virtue of laminating such a rubber or resin layer, the fiber and rubber or resin layers can be stably fixed to the female component at one end or the other end thereof. Still further, by virtue of the second rubber or resin layer of water and/or oil repellency laminated on the at least one surface of the fiber layer, the entry of dust, grease, oil, and the like into the fiber layer as well as the degradation of the fiber layer can be reduced. Still further, since the surface friction coefficient of the second rubber or resin layer is lower than the previous one, the second rubber or resin layer causes less sliding wear between the male component and the seal members, thereby improving the durability of the seal member(s), i.e., increasing the life of the seal member(s), and eventually increasing the life of the ball screw.

[5] A seal member according to the present invention is characterized in that a male component of the ball screw having a plurality of male grooves formed on an outer periphery thereof such that a ball is allowed to roll in the plurality of male grooves, and a female component of the ball screw having a plurality of female grooves facing the plurality of male grooves formed on an inner periphery thereof such that the ball is allowed to roll in the plurality of female grooves, and having a circulation path formed therein such that the ball is allowed to circulate through the circulation path, are fitted together in an axial direction, and that the seal member comprises: a hole capable of communicating with the inner periphery of the female component; a fiber layer having a fitting surface formed with a convex part capable of being fitted in the plurality of male grooves of the male component when the male component is inserted into the hole, the fitting surface having at least a surface made of fibers impregnated with rubber or resin; and a rubber or resin layer laminated on a surface opposite to the fitting surface of the fiber layer.

According to the construction of [5] above, in attempt to apply the seal members according to the present invention to: the male component of the ball screw having the plurality of male grooves formed on the outer periphery thereof such that the ball is allowed to roll in the plurality of male grooves; and the female component of the ball screw having the plurality of female grooves facing the plurality of male grooves formed on the inner periphery thereof such that the ball is allowed to roll in the plurality of female grooves and having the circulation path formed therein such that the ball is allowed to circulate through the circulation path, one can make the fiber layer, which is on the fitting surface formed with the convex part, of fibers impregnated with rubber or resin, thereby capable of strongly bonding the fibers with rubber or resin, thereby capable of maintaining the shape of the convex part of the fiber layer, and thereby capable of simultaneously reducing the entry of fine foreign substances between the male and female components as well as reducing the sliding resistance therebetween when shifting the male and female components in a relative manner in an axial direction, both of which are trade-off related to each other. Further, by laminating the rubber or resin layer for reinforcement on the surface of the fiber layer on a side opposite to a hole-formed side, one can stabilize the shape of the convex part of the fiber layer, and reduce the deformation of the fiber layer as a whole when causing the ball screw to work. Still further, by laminating such a rubber or resin layer, the one can stably fix fiber and rubber or resin layers to the female component at one end or the other end thereof.

[6] A seal member according to the present invention is characterized in that a male component of the ball screw having a plurality of male grooves formed on an outer periphery thereof such that a ball is allowed to roll in the plurality of male grooves, and a female component of the ball screw having a plurality of female grooves facing the plurality of male grooves formed on an inner periphery thereof such that the ball is allowed to roll in the plurality of female grooves, and having a circulation path formed therein such that the ball is allowed to circulate through the circulation path, are fitted together in an axial direction, and that the seal member comprises: a hole capable of communicating with the inner periphery of the female component; a fiber layer having a fitting surface formed with a convex part capable of being fitted in the plurality of male grooves of the male component when the male component is inserted into the hole, the fitting surface having at least a surface made of fibers impregnated with rubber or resin; and a rubber or resin layer laminated on a surface opposite to the fitting surface of the fiber layer, and that a length of the fitting surface in the axial direction is shorter than or equal to a pitch width of the plurality of male grooves of the male component.

According to the construction of [6] above, in attempt to apply the seal members according to the present invention to: the male component of the ball screw having the plurality of male grooves formed on the outer periphery thereof such that the ball is allowed to roll in the plurality of male grooves; and the female component of the ball screw having the plurality of female grooves facing the plurality of male grooves formed on the inner periphery thereof such that the ball is allowed to roll in the plurality of female grooves and having the circulation path formed therein such that the ball is allowed to circulate through the circulation path, one can make the fiber layer, which is on the fitting surface formed with the convex part, of fibers impregnated with rubber or resin, thereby capable of strongly bonding the fibers with rubber or resin, thereby capable of maintaining the shape of the convex part of the fiber layer, and thereby capable of simultaneously reducing the entry of fine foreign substances between the male and female components as well as reducing the sliding resistance therebetween when shifting the male and female components in a relative manner in an axial direction, both of which are trade-off related to each other. Further, by laminating the rubber or resin layer for reinforcement on the surface of the fiber layer on a side opposite to a hole-formed side, one can stabilize the shape of the convex part of the fiber layer, and reduce the deformation of the fiber layer as a whole when causing the ball screw to work. Still further, by laminating such a rubber or resin layer, the one can stably fix fiber and rubber or resin layers to the female component at one end or the other end thereof. Still further, by rendering the length of the fitting surface in the axial direction as being shorter than or equal to the pitch width of the plurality of male grooves of the male component, one can render the seal member as being less rigid so as to exhibit full flexibility, thereby promoting the fitting surface to follow the surface of the male component. As a result, by virtue of the ball screw according to the present invention, one can improve sealing property by closing a gap between the seal member and the male component even when causing the ball screw to work.

[7] Regarding the seal member according to the present invention, a plurality of seal members, as the seal member according to [6] above, may be arranged coaxially in series in a continuous manner. A gap may be made between the seal members.

According to the construction of [7] above, the plurality of seal members as the seal member according to [6] above arranged coaxially in series in a continuous manner can achieve lower in rigidity than a single-piece seal member having the same fitting surface in length in an axial direction as the construction of [7] above. As a result, the slidability of the fitting surface is improved in comparison with that of the single-piece seal member. The seal members in the construction of [7] above are more flexible than the single-piece seal member, and therefore the fitting surface of the seal members in the construction of [7] above is promoted to follow the surface of the male component in comparison with the single-piece seal member. According to the construction of [7] above, the edges of the respective seal members (on the side contacting the male component) are configured such that dust and the like can be scraped off the surface of the male component. In other words, the seal members according to the construction of [7] above can reduce the entry of dust and the like into the ball screw to a greater degree than the single-piece seal member does.

[8] A seal member according to the present invention is characterized in that a male component of the ball screw having a plurality of male grooves formed on an outer periphery thereof such that a ball is allowed to roll in the plurality of male grooves, and a female component of the ball screw having a plurality of female grooves facing the plurality of male grooves formed on an inner periphery thereof such that the ball is allowed to roll in the plurality of female grooves, and having a circulation path formed therein such that the ball is allowed to circulate through the circulation path, are fitted together in an axial direction, and that the seal member comprises: a hole capable of communicating with the inner periphery of the female component; a fiber layer configured such that the fiber layer can be fitted with the plurality of male grooves of the male component when the male component is inserted into the hole, the fiber layer having at least one surface made of fibers impregnated with rubber or resin; a first rubber or resin layer laminated on a surface opposite to the at least one surface of the fiber layer; and a second rubber or resin layer of water and/or oil repellency laminated with a predetermined thickness on the at least one surface of the fiber layer.

According to the construction [8] above, when applying the seal members according to the present invention to a male component having a plurality of male grooves formed on an outer periphery thereof in which a ball is allowed to roll, and a female component having a plurality of female grooves facing the plurality of male grooves formed on an inner periphery thereof in which the ball is allowed to roll, and having a circulation path through which the ball is allowed to circulate, by virtue of the at least one surface of the fiber layer, which can be fitted with the plurality of male grooves of the male component when the male component is inserted into the hole, of fibers impregnated with rubber or resin, the fibers can be strongly bonded with rubber or resin, thereby not only maintaining the shape of the at least one surface of the fiber layer but also accomplishing simultaneously the reduction of the entry of fine foreign substances between the male and female components as well as the reduction of the sliding resistance therebetween when shifting the male and female components in a relative manner in an axial direction, both of which reductions are trade-off related to each other. Further, by laminating the rubber or resin layer for reinforcement on the surface of the fiber layer on a side opposite to a hole-formed side, the shape of the convex part of the fiber layer can be stabilized, and the deformation of the fiber layer as a whole when causing the ball screw to work can be reduced. Still further, by virtue of laminating such a rubber or resin layer, the fiber and rubber or resin layers can be stably fixed to the female component at one end or the other end thereof. Still further, by virtue of the second rubber or resin layer of water and/or oil repellency laminated on the at least one surface of the fiber layer, the entry of dust, grease, oil, and the like into the fiber layer as well as the degradation of the fiber layer can be reduced. Still further, since the surface friction coefficient of the second rubber or resin layer is lower than the previous one, the second rubber or resin layer causes less sliding wear between the male component and the seal members, thereby improving the durability of the seal member(s), i.e., increasing the life of the seal member(s).

[9] A seal structure according to the present invention applied to a ball screw is characterized in that a male component of the ball screw having a plurality of male grooves formed on an outer periphery thereof such that a ball is allowed to roll in the plurality of male grooves, and a female component of the ball screw having a plurality of female grooves facing the plurality of male grooves formed on an inner periphery thereof such that the ball is allowed to roll in the plurality of female grooves, and having a circulation path formed therein such that the ball is allowed to circulate through the circulation path, are fitted together in an axial direction, and that the seal structure comprises: a hole capable of communicating with the inner periphery of the female component; and a fiber layer having a fitting surface formed with a convex part capable of being fitted in the plurality of male grooves of the male component when the male component is inserted into the hole, the fitting surface having at least a surface made of fibers impregnated with rubber or resin.

According to the construction of [9] above, by virtue of making the fiber layer, which is on the fitting surface formed with the convex part, of fibers impregnated with rubber or resin, the fibers can be strongly bonded with rubber or resin, thereby capable of maintaining the shape of the convex part of the fiber layer, and thereby capable of simultaneously reducing the entry of fine foreign substances between the male and female components as well as the sliding resistance therebetween when shifting the male and female components in a relative manner in an axial direction, which entry and sliding resistance are trade-off related to each other.

[10] A seal structure according to the present invention applied to a ball screw is characterized in that a male component of the ball screw having a plurality of male grooves formed on an outer periphery thereof such that a ball is allowed to roll in the plurality of male grooves, and a female component of the ball screw having a plurality of female grooves facing the plurality of male grooves formed on an inner periphery thereof such that the ball is allowed to roll in the plurality of female grooves, and having a circulation path formed therein such that the ball is allowed to circulate through the circulation path, are fitted together in an axial direction, and that the seal structure comprises: a hole capable of communicating with the inner periphery of the female component; and a fiber layer having a fitting surface formed with a convex part capable of being fitted in the plurality of male grooves of the male component when the male component is inserted into the hole, the fitting surface having at least a surface made of fibers impregnated with rubber or resin, and that a length of the fitting surface in the axial direction is shorter than or equal to a pitch width of the plurality of male grooves of the male component.

According to the construction of [10] above, by virtue of making the fiber layer, which is on the fitting surface formed with the convex part, of fibers impregnated with rubber or resin, the fibers can be strongly bonded with rubber or resin, thereby capable of maintaining the shape of the convex part of the fiber layer, and thereby capable of simultaneously reducing the entry of fine foreign substances between the male and female components as well as the sliding resistance therebetween when shifting the male and female components in a relative manner in an axial direction, which entry and sliding resistance are trade-off related to each other.

[11] Regarding the seal structure according to the present invention, a plurality of seal structures, as the seal structure according to [10] above, may be arranged coaxially in series in a continuous manner. A gap may be made between the seal structures.

According to the construction of [11] above, the plurality of seal structures as the seal structure according to [10] above arranged coaxially in series in a continuous manner can achieve lower in rigidity than a single-piece seal structure having the same fitting surface in length in an axial direction as the construction of [11] above. As a result, the slidability of the fitting surface is improved in comparison with that of the single-piece seal structure. The seal structures in the construction of [11] above are more flexible than the single-piece seal structure, and therefore the fitting surface is promoted to follow the surface of the male component in comparison with the single-piece seal structure. According to the construction of [11] above, the edges of the respective seal structures (on the side contacting the male component) are configured such that dust and the like can be scraped off the surface of the male component. In other words, the seal structures according to the construction of [11] above can reduce the entry of dust and the like into the ball screw to a greater degree than the single-piece seal structure does.

[12] A seal structure according to the present invention is characterized in that a male component of the ball screw having a plurality of male grooves formed on an outer periphery thereof such that a ball is allowed to roll in the plurality of male grooves, and a female component of the ball screw having a plurality of female grooves facing the plurality of male grooves formed on an inner periphery thereof such that the ball is allowed to roll in the plurality of female grooves, and having a circulation path formed therein such that the ball is allowed to circulate through the circulation path, are fitted together in an axial direction, and that the seal structure comprises: a hole capable of communicating with the inner periphery of the female component; a fiber layer configured such that the fiber layer can be fitted with the plurality of male grooves of the male component when the male component is inserted into the hole, the fiber layer having at least one surface made of fibers impregnated with rubber or resin; and a rubber or resin layer of water and/or oil repellency laminated with a predetermined thickness on the at least one surface of the fiber layer.

According to the construction of [12] above, by virtue of the at least one surface of the fiber layer, which can be fitted with the plurality of male grooves of the male component when the male component is inserted into the hole, of fibers impregnated with rubber or resin, the fibers can be strongly bonded with rubber or resin, thereby capable of maintaining the shape of the at least one surface of the fiber layer. Further, it is possible to accomplish simultaneously the reduction of the entry of fine foreign substances between the male and female components as well as the reduction of the sliding resistance therebetween when shifting the male and female components in a relative manner in an axial direction, both of which reductions are trade-off related to each other. Still further, by virtue of the rubber or resin layer of water and/or oil repellency laminated on the at least one surface of the fiber layer, the entry of dust, grease, oil, and the like into the fiber layer as well as the degradation of the fiber layer can be reduced. Still further, since the surface friction coefficient of the rubber or resin layer is lower than the previous one, the rubber or resin layer causes less sliding wear between the male component and the seal structures, thereby improving the durability of the seal structure(s), i.e., increasing the life of the seal structure(s), and eventually increasing the life of the ball screw.

BRIEF DESCRIPTION OF THE DRAWINGS

For more thorough understanding of the present invention and advantages thereof, the following descriptions should be read in conjunction with the accompanying drawings, in which.

DETAILED DESCRIPTION

First Embodiment

Figure 1:
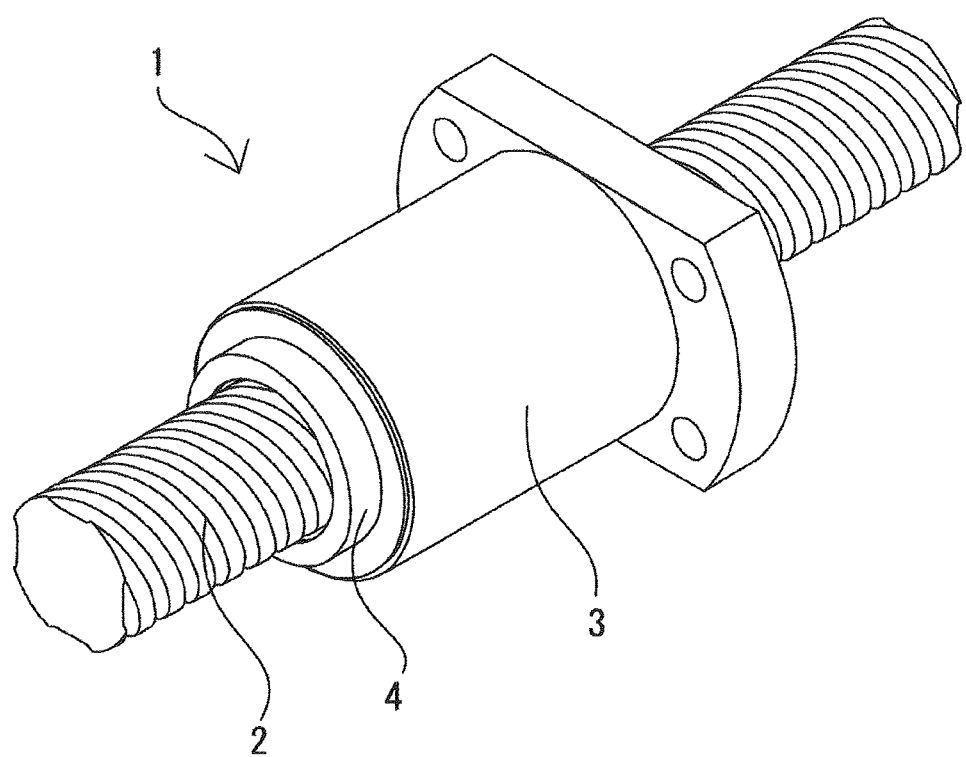
FIG. 1 depicts an example of perspective view showing a schematic structure of a ball screw in a first embodiment of the present invention.

Hereinafter, the ball screw in the first embodiment of the present invention will be described with reference to FIGS. 1-5. Regarding a pair of seal members (4) shown in FIG. 2 not necessarily needed to be explained separately, it is to be noted that each of the parts is provided with a reference numeral with respect to one seal member (4) (on the left), while reference numerals are appropriately omitted for some parts with respect to the other seal member (4) (on the right), for the sake of simplification.

Figure 2:
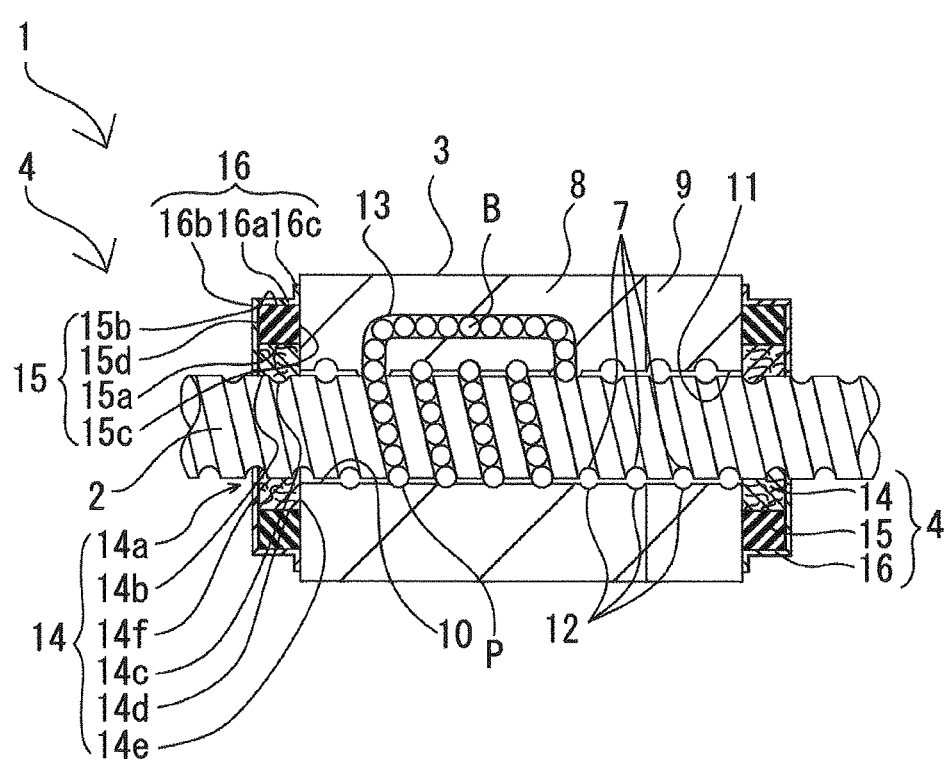
FIG. 2 depicts an example of explanatory view showing the internal structures of the female component and seal members in the first embodiment.

The ball screw (1), as shown in FIGS. 1 and 2, includes a male component (2), a female component (3), and a pair of seal members (4).

Figure 3:
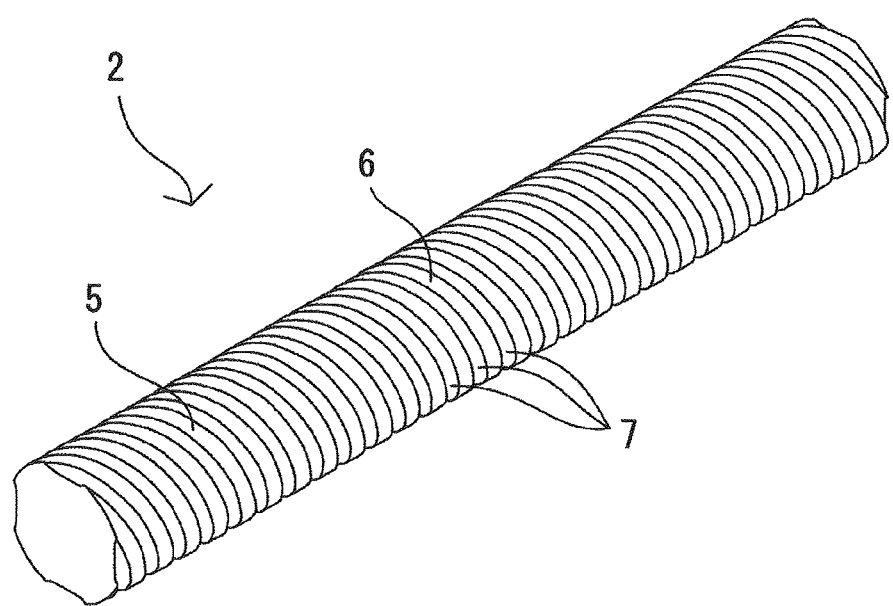
FIG. 3 depicts an example of perspective view of the male component of the ball screw in the first embodiment.

The male component (2) is metallic and, as shown in FIG. 3, has a rod-shaped main body part (5) and a plurality of male grooves (7) formed in a spiral manner on the outer periphery (6) of the main body part (5).

Figure 4:
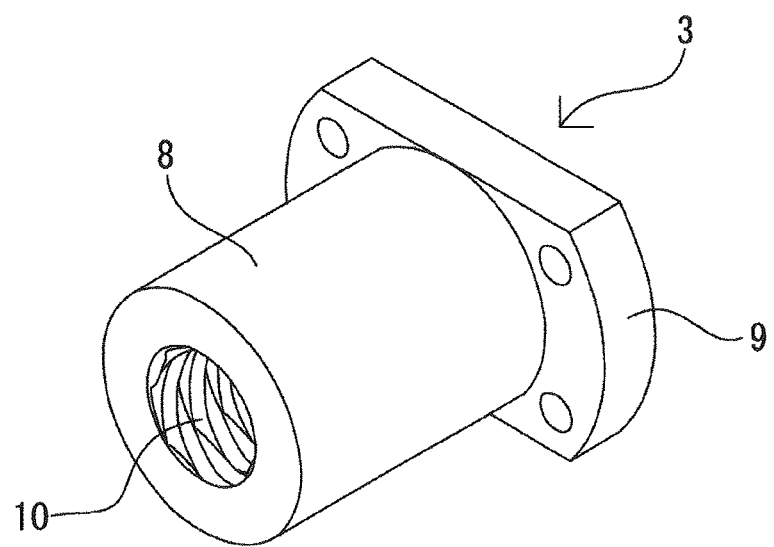
FIG. 4 depicts an example of perspective view of the female component of the ball screw in the first embodiment.

The female component (3) is metallic and, as shown in FIG. 4, has a cylindrical part (8) in a cylindrical shape, and a platy part (9) in a platy shape formed on an end of the cylindrical part (8). The cylindrical part (8) and the platy part (9) are integrally molded. As shown in FIG. 2, a plurality of female grooves (12) are formed on the inner peripheries (10, 11) of the cylindrical part (8) and the platy part (9). Each female groove (12) is spirally formed in a similar manner to each male groove (7), and formed at a position where the female groove (12) faces the male groove (7) of the male component (2) as shown in FIG. 2. Further, as shown in FIG. 2, circulation paths (13), through which a plurality of balls B can circulate, are formed inside the cylindrical part (8), and paths P capable of communicating with the circulation paths (13) are formed between the male grooves (7) and the female grooves (12). The paths P are filled with the plurality of balls B.

The ball screw (1) in this embodiment is configured as an endless circulation path such that the relative rotation of the male and female components (2, 3) allows the balls B to roll through the paths P and thereafter return to an original position through the circulation paths (13). Such circulation of the balls B is performed in a repetitive manner, which enables the male and female components (2, 3) to shift in a relative manner in an axial direction while being fitted together. The male grooves (7) in this embodiment are formed in a four thread screw structure. In other words, the number of threads with respect to the grooves is four, and therefore four circulation paths (13) are formed accordingly.

As shown in FIG. 2, each of the seal members (4) includes a fiber layer (14), a resin layer (15), and a cover member (16).

The fiber layer (14) may be made of, e.g., aramid fiber, nylon, urethane, cotton, silk, linen, acetate, rayon, fluorine-containing fiber, polyester, or the like, which are impregnated with rubber or resin. The fiber layer (14) may be made of e.g., short fibers and long fibers.

By virtue of impregnating fibers with rubber or resin, rubber material or resin material is enabled to penetrate into the gaps within the fibers, and to serve as fiber layer (14) so as to bond these fibers. Further, by virtue of impregnating fibers with rubber and the like, the wear caused by friction between the fibers can be reduced, and still further, the resistance to wear on the fiber layer (14) caused by friction between the fiber layer (14) and male component (2) can be improved.

The rubber is required to be that with which the fibers can be impregnated. As such types of rubber, the followings may be used in a neat form or in a form denatured in various ways: e.g., urethane rubber, nitrile rubber, silicon rubber, fluororubber, acrylic rubber, ethylene-propylene rubber, butyl rubber, isoprene rubber, chlorinated polyethylene rubber, epichlorohydrin rubber, hydrogenated nitrile rubber, chloroprene rubber, polybutadiene rubber, styrene-butadiene rubber, natural rubber, and the like. Each of these types of rubber may be used alone, or a plurality of types of rubber selected therefrom may be used in a blended form. Further, the rubber may contain appropriate amounts of traditional compounding ingredients for rubber, such as vulcanizing agent, vulcanizing accelerator, antioxidant, softener, plasticizer, filler, colorant, and the like as well as solid lubricants such as graphite, silicone oil, fluorine powder, molybdenum disulfide, or the like for enhancing the lubricity of the fiber layer (14). Still further, the above types of rubber may be replaced by or combined with thermoplastic or thermosetting resin such as acrylic resin, polyester resin, urethane resin, vinyl chloride resin, polypropylene, polycarbonate, polyethylene terephthalate resin, fluorine resin, polyethylene, acrylonitrile-styrene resin, acrylonitrile-butadiene-styrene resin, polystyrene resin, polyvinyl chloride, polyvinylidene chloride, polyvinyl acetate, nylon, alkyd resin, phenolic resin, epoxy resin, polyphenylene sulfide resin, and the like.

When impregnating fibers with rubber or resin as described above, it is preferable that the rubber or resin be dissolved by a solvent or another means into a liquid state before dipping the predetermined fibers (short or long fibers) in the liquid. The sheet-like fabric made of the fibers may be used as a precursor of the fiber layer (14). This fabric is impregnated with rubber or resin in the same way as mentioned above.

The fabric may be, e.g., non-woven fabric made of irregularly tangled fibers, regularly-formed woven, knitted fabric, or the like. These fabrics are characterized by facilitating impregnation (easier handling) with rubber and the like, and further facilitating adhesion to the surface of the cover member (16) in comparison with those made of fibers (short or long fibers) only, because these fabrics are in sheet form. The woven fabric may be made in a plain weave, satin weave, twill weave, or the like.

The fabric may preferably be stretchy to some extent. By virtue of such stretchiness, when the fabric is formed so as to be in line with the male grooves (7) in shape, there can be achieved the advantageous effects that: the surface of the fabric can easily be shaped in accordance with the form of the male grooves (7); and the fiber layer (14) has the surface subjected to few creases and uniformly finished, thereby enabling smooth fitting between the male component (2) and the seal members (4), and further enabling decrease in sliding resistance therebetween. By producing the fiber layer (14) of the fabric in such a manner that a stretchiness direction of the fabric in particular can coincide with at least a height direction (an axial direction of the ball screw) of the cylindrically-shaped fiber layer (14), it becomes possible that the surface of the fiber layer (14) is subjected to fewer creases.

Figure 5:
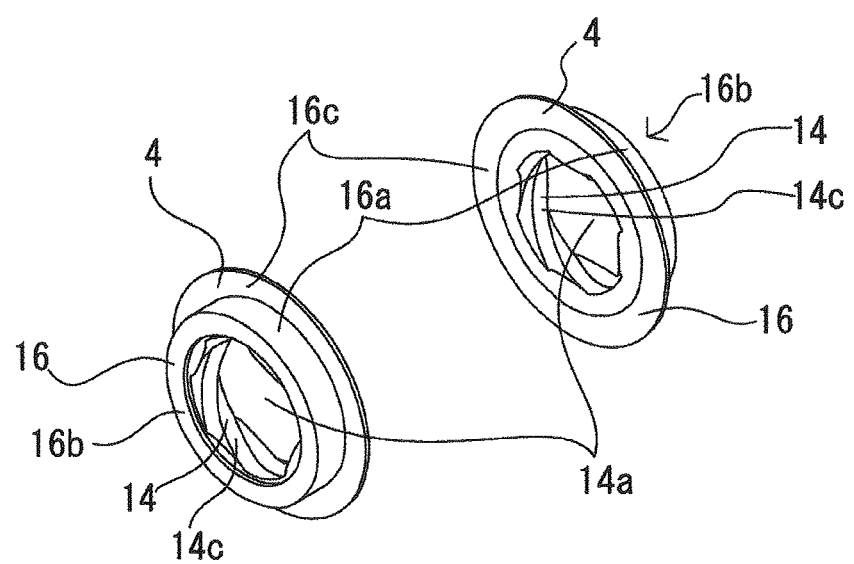
FIG. 5 depicts an example of perspective view of the seal members of the ball screw in the first embodiment.

The fiber layer (14), as shown in FIG. 5, is a cylindrically-shaped layer having a hole (14a) defined therein. As shown in FIG. 2, the hole (14a) is configured such that it communicates with the inner peripheries (10, 11) of the female component (3). The fiber layer (14) includes an inner periphery (fitting surface) (14b) arranged at a position where it surrounds the hole (14a), and a convex part 14c formed on the inner periphery (14b). The convex part (14c) is arranged on a region such that, when inserting the male component (2) into the hole (14a), the convex part (14c) can be fitted in the male grooves (7) of the male component (2) inserted into the hole (14a).

As the resin layer (15), e.g., urethane rubber, nitrile rubber, silicon rubber, fluororubber, acrylic rubber, ethylene-propylene rubber, butyl rubber, isoprene rubber, chlorinated polyethylene rubber, epichlorohydrin rubber, hydrogenated nitrile rubber, chloroprene rubber, polybutadiene rubber, styrene-butadiene rubber, natural rubber, and the like may be used in a neat form or in a form denatured in various ways, or alternatively, acrylic resin, polyester resin, urethane resin, vinyl chloride resin, polypropylene, polycarbonate, polyethylene terephthalate resin, fluorine resin, and the like may be used.

The resin layer (15) is a cylindrically-shaped layer having a hole defined therein, and the outer peripheral portion of the fiber layer (14) can be inserted into such a hole. As shown in FIG. 2, the resin layer (15) is laminated on a surface (14d) on a side opposite to an inner-periphery (14b)-formed side with respect to the fiber layer (14), where the inner-periphery (14b)-formed side is indicative of a side of the fiber layer (14) at which the inner periphery (14b) is formed.

A back-up ring may be installed on the outer peripheral portion of the resin layer (15) so as to apply inward pressure to the inner periphery (14b) of the fiber layer, thereby enabling improvements in the sealing property. The back-up ring, such as O-ring, garter spring, and the like, is configured to be capable of applying inward pressure to the inner periphery (14b) of the fiber layer, and it is preferable to select a type of back-up ring capable of generating inward pressure of proper magnitude optimized with respect to a balance between the sealing property and the slidability.

The cover member (16) is made of e.g., plastic or metal and, as shown in FIG. 5, includes a cylindrical part (16a), a ring part (16b), and a ring-shaped installation part (16c), all of which are integrally molded.

Further, the cover member (16) may be adhered to the fiber layer (14) or the resin layer (15) with adhesives: e.g., acrylic resin adhesive, olefin adhesive, urethane resin adhesive, ethylene-vinyl acetate resin adhesive, epoxy resin adhesive, vinyl chloride resin adhesive, chloroprene rubber adhesive, cyanoacrylate adhesive, silicon adhesive, styrene-butadiene rubber adhesive, nitrile rubber adhesive, hot-melt adhesive, phenolic resin adhesive, melamine resin adhesive, urea resin adhesive, resorcinol adhesive, or the like. There are methods to cure an adhesive for bonding: by heating an adhesive so as to cause the adhesive to melt as fluid, applying the melting adhesive, and thereafter cooling the applied adhesive; just by heating an adhesive; or the like. As possible surfaces to be bonded, e.g., contacting surfaces of the cylindrical part (16a) and the resin layer (15) of the cover member, contacting surfaces of the ring part (16b) and the resin layer (15) of the cover member, or the like may be considered.

As shown in FIG. 2, the cylindrical part (16a) is placed on the surface (15b) on a side opposite to the surface (15a) at a fiber-layer (14)-formed side with respect to the resin layer (15), where the fiber-layer (14)-formed side is indicative of a side of the resin layer (15) at which the fiber layer (14) is formed. As shown in FIG. 2, the ring part (16b) is placed at one end of the cylindrical part (16a), and is configured such that surfaces (14f, 15d) on a side opposite to the surfaces (14e, 15c) at a female-component (3)-formed side with respect to the fiber layer (14) and the resin layer (15), respectively, are covered by the ring part (16b), where the female-component (3)-formed side is indicative of a side of the fiber layer (14) and the resin layer (15) at which the female component (3) is formed.

As shown in FIG. 2, the installation part (16c) is placed at the other end of the cylindrical part (16a). The installation part (16c) is configured such that the fiber layer (14) and the resin layer (15) covered by the cylindrical part (16a) and the ring part (16b) can be installed by use of fastening components (not shown) at each of both ends of the female component (3) in an axial direction.

The cover member (16) shall not be limited to the above form but may be configured in other forms as long as such forms allow the installation thereof at an end of the female component (3) in an axial direction. As such other forms, e.g., the fiber layer (14) and the resin layer (15) can be installed by use of fastening components (not shown) at one end or each of both ends of the female component (3) in the axial direction in such a manner that these layers are fitted in a bore formed at one end or each of both ends of the female component (3) in the axial direction before a platy cover member having a hole for allowing the male component (2) to pass therethrough is adhered to a side surface of the resin layer (15).

If the fiber layer (14) and the resin layer (15) are fitted in the bore formed at one end or each of both ends of the female component (3) in the axial direction as mentioned above and thereafter fixation screws (not shown) are drive-fitted from the cylindrical part (8) or the outer peripheral portion of the platy part (9) of the female component (3) to the resin layer (15), there are cases where the cover member (16) may not be needed.

The seal members (4) may be manufactured by performing successively the steps of, in one example: wrapping sheet-like woven fabric impregnated with rubber or the like around the outer periphery (6) of the male component (2) to form a precursor layer of the fiber layer (14); wrapping a sheet of resin around the outer periphery of the precursor layer of the fiber layer (14) to form a precursor layer of the resin layer (15); applying pressure of proper magnitude on the outer periphery of the precursor layer of the resin layer (15) to form a convex part (14c) on the inner periphery of the precursor layer of the fiber layer (14); removing the precursor layers of the fiber layer (14) and the resin layer (15) from the male component (2) by rotating them in a circumferential direction of the male component (2); cutting the precursor layers of the fiber layer (14) and the resin layer (15) into doughnut-shaped pieces to make the fiber layer (14) and the resin layer (15) from each piece; and adhering the cover member (16) to the fiber layer (14) and the resin layer (15) with adhesive. Obviously, if no cover member is needed, the cover member adhering step is omitted.

EXAMPLES

Next, the present invention will be specifically explained with reference to examples. The following descriptions are provided for the results of material tests prescribed in Japanese Industrial Standards (JIS) for examining the usefulness of the fiber layer (14) in an embodiment (see FIG. 2) as a buffer member. It is to be noted that the present invention shall not be limited to this example. More specifically, the inventors have conducted the Pico abrasion test (JIS K 6264-2) as well as the friction coefficient measurement test (JIS K 7125) using a Heidon tester to compare between nylon 66 impregnated with nitrile rubber and single-component rubber material made of nitrile rubber (hardness 70, JIS K 6253, Type A Durometer).

Table 1 below shows the results of the Pico abrasion test, and Table 2 below shows the results of the friction coefficient measurement test. In Tables 1, 2, the item "Rubber-impregnated" denotes material contained in the fiber layer (14) of this embodiment, more specifically, the nylon 66 impregnated with nitrile rubber, and the item "Single-component rubber" denotes the single-component rubber material made of nitrile rubber for comparison with the material contained in the fiber layer (14) of this embodiment.

TABLE 1

| Abrasion loss | |
| --- | --- |
| Rubber-impregnated | 2.2 mg |
| Single-component rubber | 9.9 mg |

TABLE 2

| Friction coefficient | |
| --- | --- |
| Rubber-impregnated | 0.54 |
| Single-component rubber | 1.48 |

As shown in Table 1, the abrasion loss is 2.2 mg in the nylon 66 impregnated with nitrile rubber, and is 9.9 mg in the single-component rubber material made of nitrile rubber. It is therefore found that the abrasion loss can be reduced to approximately one-fifth in the nylon 66 impregnated with nitrile rubber as compared to the single-component rubber material.

As shown in Table 2, the friction coefficient is 0.54 in the nylon 66 impregnated with nitrile rubber, and is 1.48 in the single-component rubber material made of nitrile rubber. It is found therefore that the friction coefficient can be reduced to approximately one-third in the nylon 66 impregnated with nitrile rubber as compared to the single-component rubber material.

These results demonstrate the superiority of the nylon 66 impregnated with nitrile rubber as a buffer. More specifically, the results show that the single-component rubber material formed on the outer peripheral portion of the male component (2) can indeed reduce the tooth-hit noise generated between the male and female components (2, 3), while increases the sliding resistance (the friction coefficient is increased). Meanwhile, the fiber layer (14) containing the nylon 66 impregnated with nitrile rubber formed on the outer peripheral portion of the male component (2) can reduce the sliding resistance (the friction coefficient is decreased more than that of the single-component rubber material formed on the outer peripheral portion of the male component (2)), and can improve the durability (the abrasion loss is decreased further than that of the single-component rubber material formed on the outer peripheral portion of the male component (2)).

(Features of Ball Screw of First Embodiment)

According to the above construction, by virtue of making the fiber layer (14), which is fitted with the male grooves (7) of the male component (2), of woven fabric impregnated with rubber or the like, there can be simultaneously accomplished the reduction of the entry of fine foreign substances between the male and female components (2, 3) as well as the reduction of the sliding resistance therebetween when shifting them in a relative manner in an axial direction, both of which reductions as two problems are trade-off related to each other. Further, the fiber layer (14) impregnated with rubber or the like can improve the resistance to wear on the surface of the fiber layer (14) caused by friction generated between the fiber layer (14) and the male component (2). Still further, by laminating the resin layer (15) for reinforcing the fiber layer (14) on the surface (14d) opposite to the surface (14b) on which a hole (14a) is formed with respect to the fiber layer (14), the fiber layer (14) and the resin layer (15) can be stably fixed to the female component (3) at both ends thereof through the use of the cover member (16).

Specific constructions according to the present invention are not limited to the first embodiment described above with reference to the drawings. The scope of the present invention is not encompassed by the above explanations of the embodiment but particularly pointed out by the claims, and the equivalents of the claim recitations as well as all the modifications within the scope of the claims fall within the scope of the present invention.

For example, in the first embodiment, there is described an example of arranging a pair of seal members (4) at both ends of the female component (3), respectively, in the axial direction; however, the present invention shall not be limited to such an example, and a seal member (4) may be arranged at any one of the two ends of the female component (3) in the axial direction, in accordance with the usage circumstances.

The first embodiment shows an example of male grooves (7) of a male component (2) having four thread screw structure, but the present invention shall not be limited to the example, and the number of threads of the male grooves (7) may be changed in accordance with the usage circumstances of the ball screw (1).

In the first embodiment, there is described an example of impregnating fibers of the fiber layer (14) with rubber or the like; however, the present invention shall not be limited to such an example, and the fibers are required to be those which can be impregnated with rubber or the like and which have low sliding resistance against the metal surface, and sheet-like fabric made of fibers may be used for the fiber layer (14). For example, canvas, velvet, denim, woven fabric, knitted fabric impregnated with rubber or the like may be used. Horizontally and/or vertically stretchy fibers may also be used.

Second Embodiment

Hereinafter, the ball screw in the first embodiment of the present invention will be described with reference to FIGS. 6-10. Regarding a pair of seal members (104) shown in FIG. 7 not necessarily needed to be explained separately, it is to be noted that each of the parts is provided with a reference numeral with respect to one seal member (104) (on the left), while reference numerals are appropriately omitted for some parts with respect to the other seal member (104) (on the right), for the sake of simplification.

Figure 6:
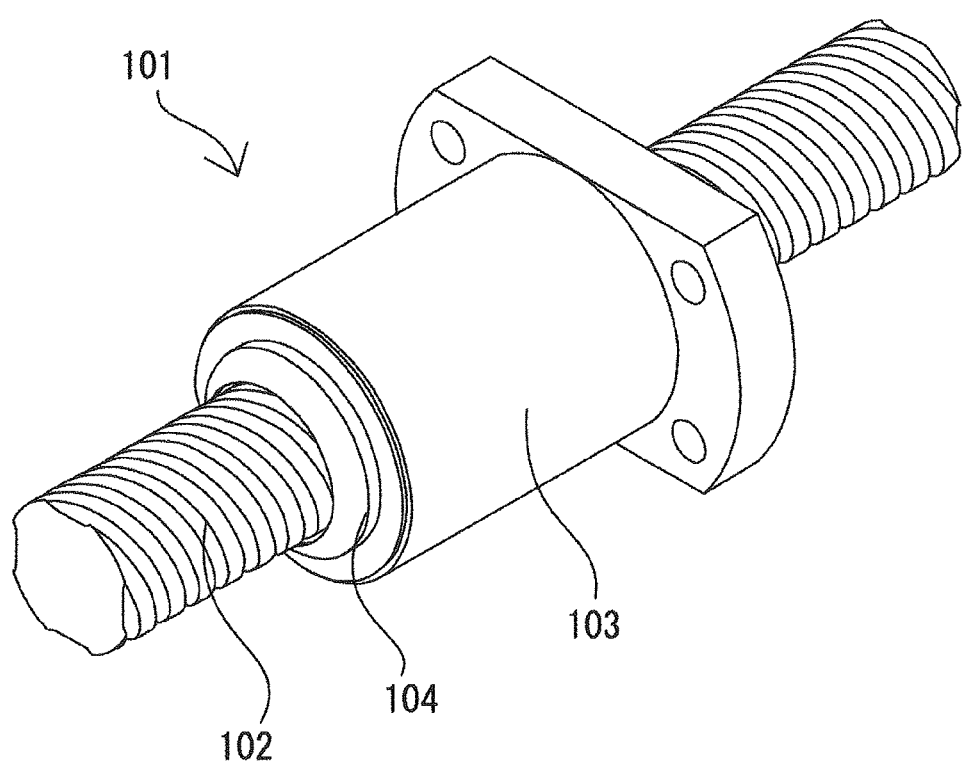
FIG. 6 depicts an example of perspective view showing a schematic structure of the ball screw in a second embodiment of the present invention.
Figure 7:
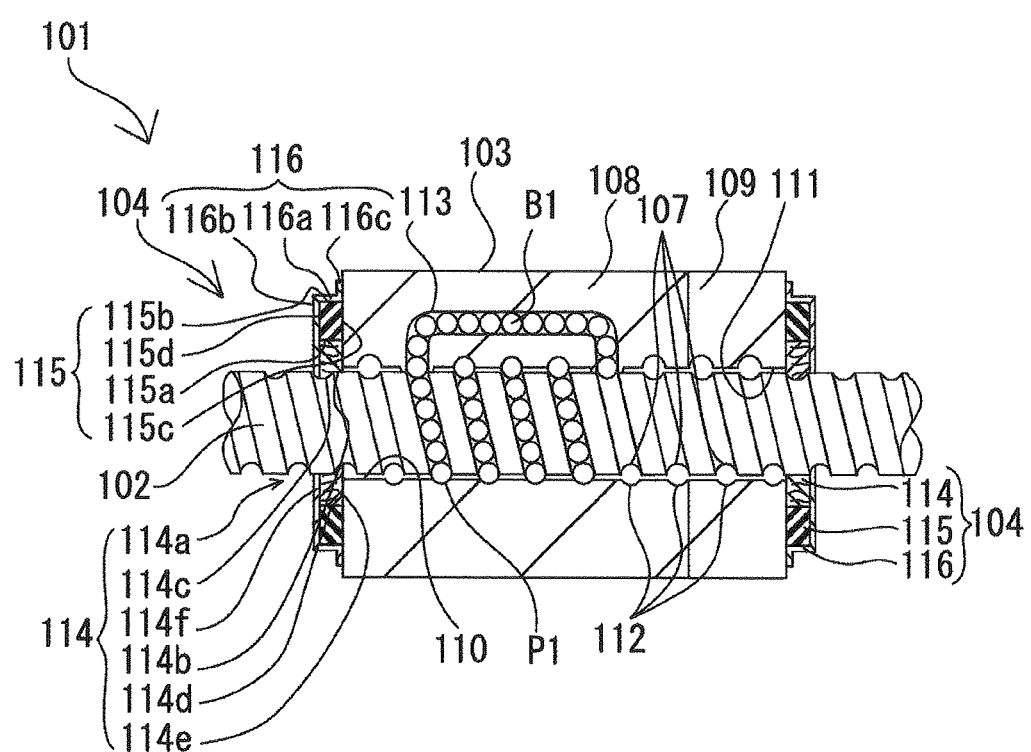
FIG. 7 depicts an example of explanatory view showing the internal structures of the female component and seal members in the second embodiment.

The ball screw (101), as shown in FIGS. 6 and 7, includes a male component (102), a female component (103), and a pair of seal members (104).

Figure 8:
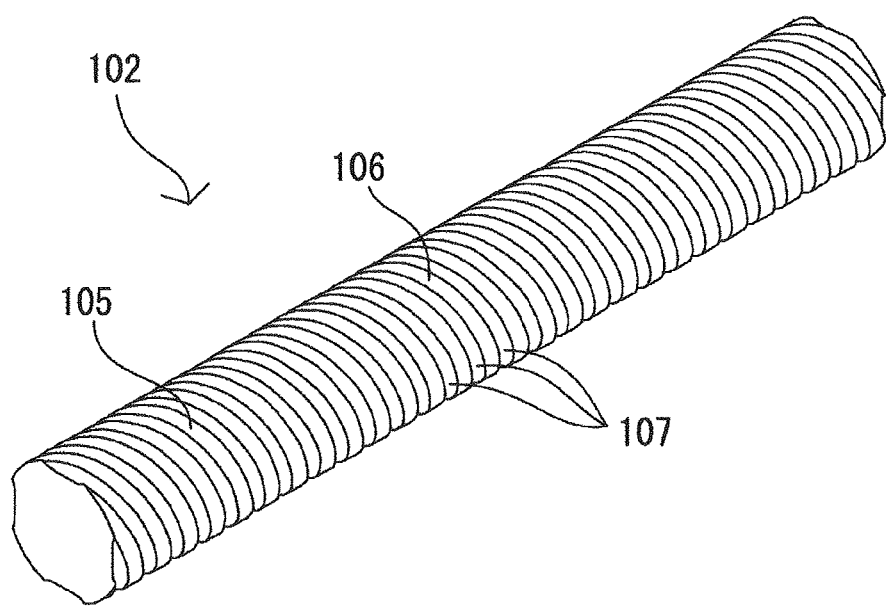
FIG. 8 depicts an example of perspective view of the male component of the ball screw in the second embodiment.

The male component (102) is metallic and, as shown in FIG. 8, has a rod-shaped main body part (105) and a plurality of male grooves (107) formed in a spiral manner on the outer periphery (106) of the main body part (105).

Figure 9:
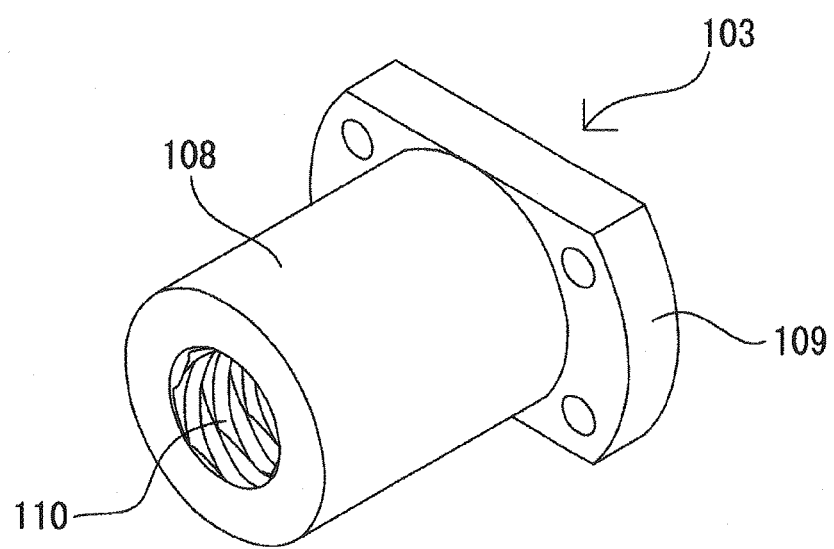
FIG. 9 depicts an example of perspective view of the female component of the ball screw in the second embodiment.

The female component (103) is metallic and, as shown in FIG. 9, has a cylindrical part (108) in a cylindrical shape, and a platy part (109) in a platy shape formed on an end of the cylindrical part (108). The cylindrical part (108) and the platy part (109) are integrally molded. As shown in FIG. 7, a plurality of female grooves (112) are formed on the inner peripheries (110, 111) of the cylindrical part (108) and the platy part (109). Each female groove (112) is spirally formed in a similar manner to each male groove (107), and formed at a position where the female groove (112) faces the male groove (107) of the male component (102) as shown in FIG. 7. Further, as shown in FIG. 7, circulation paths (113), through which a plurality of balls B1 can circulate, are formed inside the cylindrical part (108), and paths P1 capable of communicating with the circulation paths (113) are formed between the male grooves (107) and the female grooves (112). The paths P1 are filled with the plurality of balls B1.

The ball screw (101) in this embodiment is configured as an endless circulation path such that the relative rotation of the male and female components (102, 103) allows the balls B1 to roll through the paths P1 and thereafter return to an original position through the circulation paths (113). Such circulation of the balls B1 is performed in a repetitive manner, which enables the male and female components (102, 103) to shift in a relative manner in an axial direction while being fitted together. The male grooves (107) in this embodiment are formed in a four thread screw structure. In other words, the number of threads with respect to the grooves is four, and therefore four circulation paths (113) are formed accordingly.

As shown in FIG. 7, each of the seal members (104) includes a fiber layer (114), a resin layer (115), and a cover member (116).

The fiber layer (114) may be made of, e.g., aramid fiber, nylon, urethane, cotton, silk, linen, acetate, rayon, fluorine-containing fiber, polyester, or the like, which are impregnated with rubber or resin. The fiber layer (114) may be made of e.g., short fibers and long fibers.

By virtue of impregnating fibers with rubber or resin, rubber material or resin material is enabled to penetrate into the gaps within the fibers, and to serve as fiber layer (114) so as to bond these fibers. Further, by virtue of impregnating fibers with rubber and the like, the wear caused by friction between the fibers can be reduced, and still further, the resistance to wear on the fiber layer (114) caused by friction between the fiber layer (114) and male component (102) can be improved.

The rubber is required to be that with which the fibers can be impregnated. As such types of rubber, the followings may be used in a neat form or in a form denatured in various ways: e.g., urethane rubber, nitrile rubber, silicon rubber, fluororubber, acrylic rubber, ethylene-propylene rubber, butyl rubber, isoprene rubber, chlorinated polyethylene rubber, epichlorohydrin rubber, hydrogenated nitrile rubber, chloroprene rubber, polybutadiene rubber, styrene-butadiene rubber, natural rubber, and the like. Each of these types of rubber may be used alone, or a plurality of types of rubber selected therefrom may be used in a blended form. Further, the rubber may contain appropriate amounts of traditional compounding ingredients for rubber, such as vulcanizing agent, vulcanizing accelerator, antioxidant, softener, plasticizer, filler, colorant, and the like as well as solid lubricants such as graphite, silicone oil, fluorine powder, molybdenum disulfide, or the like for enhancing the lubricity of the fiber layer (114). Still further, the above types of rubber may be replaced by or combined with thermoplastic or thermosetting resin such as acrylic resin, polyester resin, urethane resin, vinyl chloride resin, polypropylene, polycarbonate, polyethylene terephthalate resin, fluorine resin, polyethylene, acrylonitrile-styrene resin, acrylonitrile-butadiene-styrene resin, polystyrene resin, polyvinyl chloride, polyvinylidene chloride, polyvinyl acetate, nylon, alkyd resin, phenolic resin, epoxy resin, polyphenylene sulfide resin, and the like.

When impregnating fibers with rubber or resin as described above, it is preferable that the rubber or resin be dissolved by a solvent or another means into a liquid state before dipping the predetermined fibers (short fibers, long fibers, fabric) in the liquid. The sheet-like fabric made of the fibers may be used as a precursor of the fiber layer (114). This fabric is impregnated with rubber or resin in the same way as mentioned above.

The fabric may be, e.g., non-woven fabric made of irregularly tangled fibers, regularly-formed woven, knitted fabric, or the like. These fabrics are characterized by facilitating impregnation (easier handling) with rubber and the like, and further facilitating adhesion to the surface of the cover member (116) in comparison with those made of fibers (short or long fibers) only, because these fabrics are in sheet form. The woven fabric may be made in a plain weave, satin weave, twill weave, or the like.

The fabric may preferably be stretchy to some extent. By virtue of such stretchiness, when the fabric is formed so as to be in line with the male grooves (107) in shape, there can be achieved the advantageous effects that: the surface of the fabric can easily be shaped in accordance with the form of the male grooves (107); and the fiber layer (114) has the surface subjected to few creases and uniformly finished, thereby enabling smooth fitting between the male component (102) and the seal members (104), and further enabling decrease in sliding resistance therebetween. By producing the fiber layer (114) of the fabric in such a manner that a stretchiness direction of the fabric in particular can coincide with at least a height direction (an axial direction of the ball screw) of the cylindrically-shaped fiber layer (114), it becomes possible that the surface of the fiber layer (114) is subjected to fewer creases.

Figure 10:
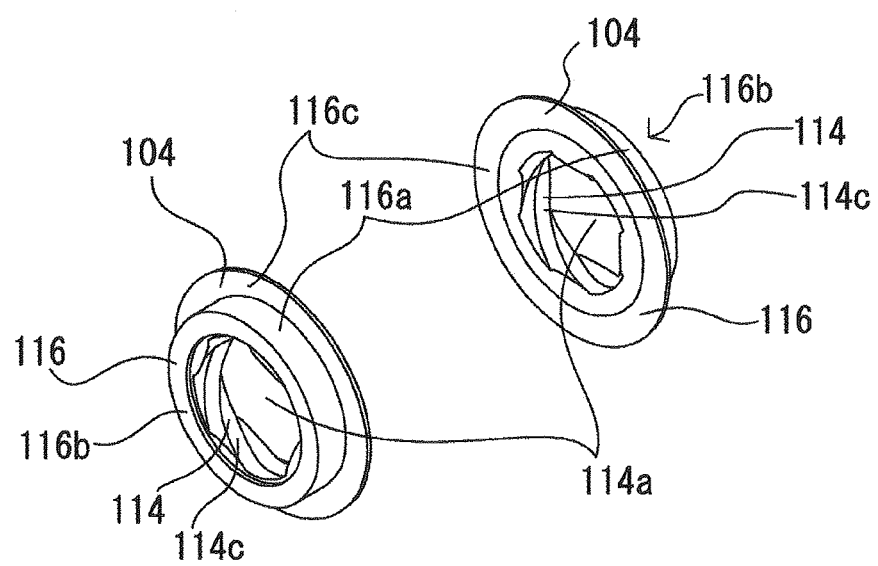
FIG. 10 depicts an example of perspective view of the seal members of the ball screw in the second embodiment.

The fiber layer (114), as shown in FIG. 10, is a cylindrically-shaped layer having a hole (114a) defined therein. As shown in FIG. 7, the hole (114a) is configured such that it communicates with the inner peripheries (110, 111) of the female component (103). The fiber layer (114) includes an inner periphery (fitting surface) (114b) arranged at a position where it surrounds the hole (114a), and a convex part (114c) formed on the inner periphery (114b). The convex part (114c) is arranged on a region such that, when inserting the male component (102) into the hole (114a), the convex part (114c) can be fitted in the male grooves (107) of the male component (102) inserted into the hole (114a). It is to be noted that the fiber layer (114) is configured such that a length of the inner periphery (114b) in the axial direction (a longitudinal direction of the male component (102)) is shorter than or equal to a pitch width of the male grooves (107) of the male component (102).

As the resin layer (115), e.g., urethane rubber, nitrile rubber, silicon rubber, fluororubber, acrylic rubber, ethylene-propylene rubber, butyl rubber, isoprene rubber, chlorinated polyethylene rubber, epichlorohydrin rubber, hydrogenated nitrile rubber, chloroprene rubber, polybutadiene rubber, styrene-butadiene rubber, natural rubber, and the like may be used in a neat form or in a form denatured in various ways, or alternatively, acrylic resin, polyester resin, urethane resin, vinyl chloride resin, polypropylene, polycarbonate, polyethylene terephthalate resin, fluorine resin, and the like may be used.

The resin layer (115) is a cylindrically-shaped layer having a hole defined therein, and the outer peripheral portion of the fiber layer (114) can be inserted into such a hole. As shown in FIG. 7, the resin layer (115) is laminated on a surface (114d) on a side opposite to an inner-periphery (114b)-formed side with respect to the fiber layer (114), where the inner-periphery (114b)-formed side is indicative of a side of the fiber layer (114) at which the inner periphery (114b) is formed.

A back-up ring may be installed on the outer peripheral portion of the resin layer (115) so as to apply inward pressure to the inner periphery (114b) of the fiber layer, thereby enabling improvements in the sealing property. The back-up ring, such as O-ring, garter spring, and the like, is configured to be capable of applying inward pressure to the inner periphery (114b) of the fiber layer, and it is preferable to select a type of back-up ring capable of generating inward pressure of proper magnitude optimized with respect to a balance between the sealing property and the slidability.

The cover member (116) is made of e.g., plastic or metal and, as shown in FIG. 10, includes a cylindrical part (116a), a ring part (116b), and a ring-shaped installation part (116c), all of which are integrally molded.

Further, the cover member (116) may be adhered to the fiber layer (114) or the resin layer (115) with adhesives: e.g., acrylic resin adhesive, olefin adhesive, urethane resin adhesive, ethylene-vinyl acetate resin adhesive, epoxy resin adhesive, vinyl chloride resin adhesive, chloroprene rubber adhesive, cyanoacrylate adhesive, silicon adhesive, styrene-butadiene rubber adhesive, nitrile rubber adhesive, hot-melt adhesive, phenolic resin adhesive, melamine resin adhesive, urea resin adhesive, resorcinol adhesive, or the like. There are methods to cure an adhesive for bonding: by heating an adhesive so as to cause the adhesive to melt as fluid, applying the melting adhesive, and thereafter cooling the applied adhesive; just by heating an adhesive; or the like. As possible surfaces to be bonded, e.g., contacting surfaces of the cylindrical part (116a) and the resin layer (115) of the cover member, contacting surfaces of the ring part (116b) and the resin layer (115) of the cover member, or the like may be considered.

As shown in FIG. 7, the cylindrical part (116a) is placed on the surface (115b) on a side opposite to the surface (115a) at a fiber-layer (114)-formed side with respect to the resin layer (115), where the fiber-layer (114)-formed side is indicative of a side of the resin layer (115) at which the fiber layer (114) is formed. As shown in FIG. 7, the ring part (116b) is placed at one end of the cylindrical part (116a), and is configured such that surfaces (114f, 115d) on a side opposite to the surfaces (114e, 115c) at a female-component (103)-formed side with respect to the fiber layer (114) and the resin layer (115), respectively, are covered by the ring part (116b), where the female-component (103)-formed side is indicative of a side of the fiber layer (114) and the resin layer (115) at which the female component (103) is formed.

As shown in FIG. 7, the installation part (116c) is placed at the other end of the cylindrical part (116a). The installation part (116c) is configured such that the fiber layer (114) and the resin layer (115) covered by the cylindrical part (116a) and the ring part (116b) can be installed by use of fastening components (not shown) at each of both ends of the female component (103) in an axial direction.

The cover member (116) shall not be limited to the above form but may be configured in other forms as long as such forms allow the installation thereof at an end of the female component (103) in an axial direction. As such other forms, e.g., the fiber layer (114) and the resin layer (115) can be installed by use of fastening components (not shown) at one end or each of both ends of the female component (103) in the axial direction in such a manner that these layers are fitted in a bore formed at one end or each of both ends of the female component (103) in the axial direction before a platy cover member having a hole for allowing the male component (102) to pass therethrough is adhered to a side surface of the resin layer (115).

If the fiber layer (114) and the resin layer (115) are fitted in the bore formed at one end or each of both ends of the female component (103) in the axial direction as mentioned above and thereafter fixation screws (not shown) are drive-fitted from the cylindrical part (108) or the outer peripheral portion of the platy part (109) of the female component (103) to the resin layer (115), there are cases where the cover member (116) may not be needed.

The seal members (104) may be manufactured by performing successively the steps of, in one example: wrapping sheet-like woven fabric impregnated with rubber or the like around the outer periphery (106) of the male component (102) to form a precursor layer of the fiber layer (114); wrapping a sheet of resin around the outer periphery of the precursor layer of the fiber layer (114) to form a precursor layer of the resin layer (115); applying pressure of proper magnitude on the outer periphery of the precursor layer of the resin layer (115) to form a convex part (114c) on the inner periphery of the precursor layer of the fiber layer (114); removing the precursor layers of the fiber layer (114) and the resin layer (115) from the male component (102) by rotating them in a circumferential direction of the male component (102); cutting the precursor layers of the fiber layer (114) and the resin layer (115) into doughnut-shaped pieces to make the fiber layer (114) and the resin layer (115) from each piece; and adhering the cover member (116) to the fiber layer (114) and the resin layer (115) with adhesive. Obviously, if no cover member is needed, the cover member adhering step is omitted.

(Features of Ball Screw of Second Embodiment)

According to the above construction, by virtue of making the fiber layer (114), which is fitted with the male grooves (107) of the male component (102), of woven fabric impregnated with rubber or the like, there can be simultaneously accomplished the reduction of the entry of fine foreign substances between the male and female components (102, 103) as well as the reduction of the sliding resistance therebetween when shifting them in a relative manner in an axial direction, both of which reductions as two problems are trade-off related to each other. Further, the fiber layer (114) impregnated with rubber or the like can improve the resistance to wear on the surface of the fiber layer (114) caused by friction generated between the fiber layer (114) and the male component (102). Still further, by laminating the resin layer (115) for reinforcing the fiber layer (114) on the surface (114d) opposite to the surface (114b) on which a hole (114a) is formed with respect to the fiber layer (114), the fiber layer (114) and the resin layer (115) can be stably fixed to the female component (103) at both ends thereof through the use of the cover member (16). Still further, by rendering the length of the inner periphery (114b) of the seal member (104) in the axial direction as being shorter than or equal to the pitch width of the plurality of male grooves of the male component (102), one can render the seal member (104) as being less rigid so as to exhibit full flexibility, thereby promoting the inner periphery (114b) to follow the surface of the male component (102). As a result, by virtue of the ball screw (101), one can improve sealing property by closing a gap between the seal member (104) and the male component (102) even when causing the ball screw (101) to work.

Specific constructions according to the present invention are not limited to the second embodiment described above with reference to the drawings. The scope of the present invention is not encompassed by the above explanations of the embodiment but particularly pointed out by the claims, and the equivalents of the claim recitations as well as all the modifications within the scope of the claims fall within the scope of the present invention.

For example, in the second embodiment, there is described an example of arranging a pair of seal members (104) at both ends of the female component (103), respectively, in the axial direction; however, the present invention shall not be limited to such an example, and a seal member (104) may be arranged at any one of the two ends of the female component (103) in the axial direction, in accordance with the usage circumstances.

The second embodiment shows an example of male grooves (107) of a male component (102) having four thread screw structure, but the present invention shall not be limited to the example, and the number of threads of the male grooves (107) may be changed in accordance with the usage circumstances of the ball screw (101).

In the second embodiment, there is described an example of impregnating fibers of the fiber layer (114) with rubber or the like; however, the present invention shall not be limited to such an example, and the fibers are required to be those which can be impregnated with rubber or the like and which have low sliding resistance against the metal surface, and sheet-like fabric made of fibers may be used for the fiber layer (114). For example, canvas, velvet, denim, woven fabric, knitted fabric impregnated with rubber or the like may be used. Horizontally and/or vertically stretchy fibers may also be used.

Further, in the second embodiment, one seal member is arranged at each of the both ends in the axial direction of the female component of the ball screw; however, this may be modified in such a manner that e.g., a plurality of seal members may be arranged coaxially in series in a continuous manner at one end or both ends of the female component, and still further, a gap may be made between the seal members. As a result, the plurality of seal members can achieve lower in rigidity than a single-piece seal member having the same fitting surface in length in the axial direction as the construction, and therefore the slidability of the fitting surface is improved in comparison with that of the single-piece seal member. Still further, the seal members in the modified example are more flexible than the single-piece seal member, and therefore the fitting surface of the seal members is promoted to follow the surface of the male component in comparison with the single-piece seal member. Still further, according to the plurality of seal members arranged coaxially in series, the edges of the respective seal members (on the side contacting the male component) are configured such that dust and the like can be scraped off the surface of the male component. In other words, the seal members can reduce the entry of dust and the like into the ball screw to a greater degree than the single-piece seal member does.

Third Embodiment

Hereinafter, the ball screw in the first embodiment of the present invention will be described with reference to FIGS. 11-15. Regarding a pair of seal members (204) shown in FIG. 12 not necessarily needed to be explained separately, it is to be noted that each of the parts is provided with a reference numeral with respect to one seal member (204) (on the left), while reference numerals are appropriately omitted for some parts with respect to the other seal member (204) (on the right), for the sake of simplification.

Figure 11:
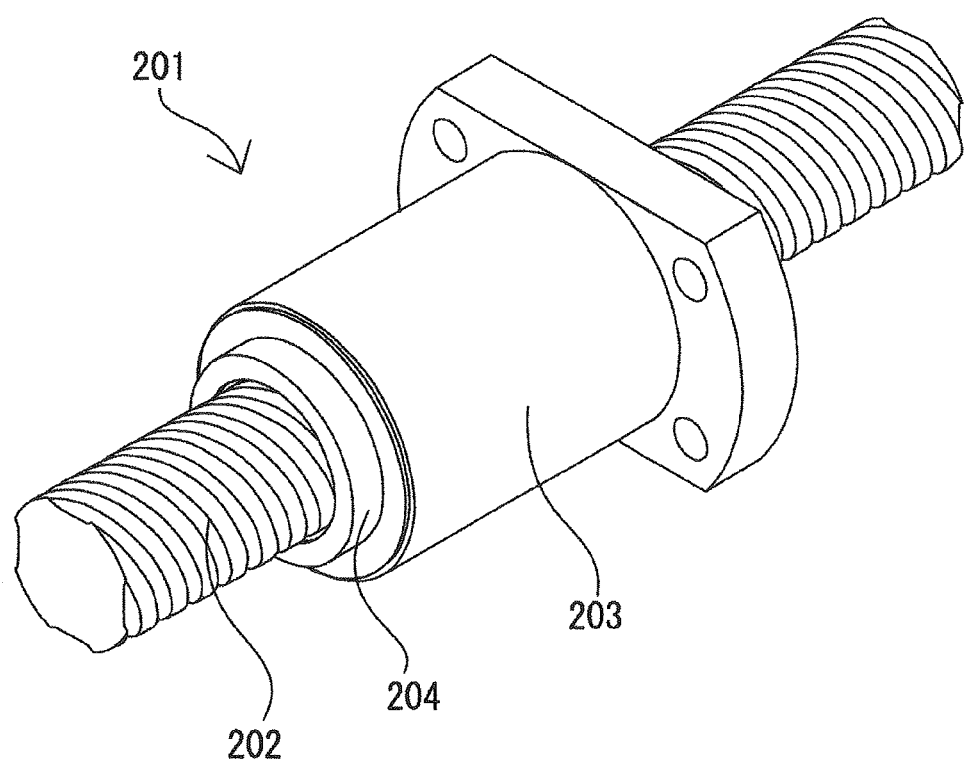
FIG. 11 depicts an example of perspective view showing a schematic structure of a ball screw in a third embodiment of the present invention.
Figure 12:
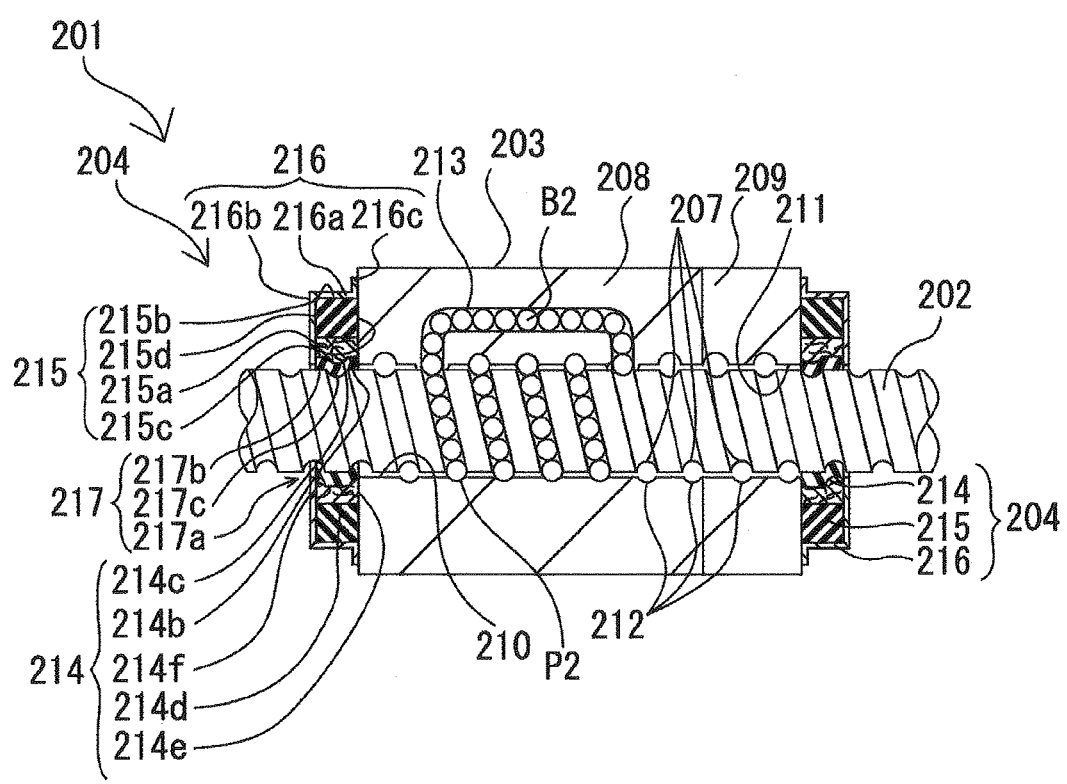
FIG. 12 depicts an example of explanatory view showing the internal structures of the female component and seal members in the third embodiment.

The ball screw (201), as shown in FIGS. 11 and 12, includes a male component (202), a female component (203), and a pair of seal members (204).

Figure 13:
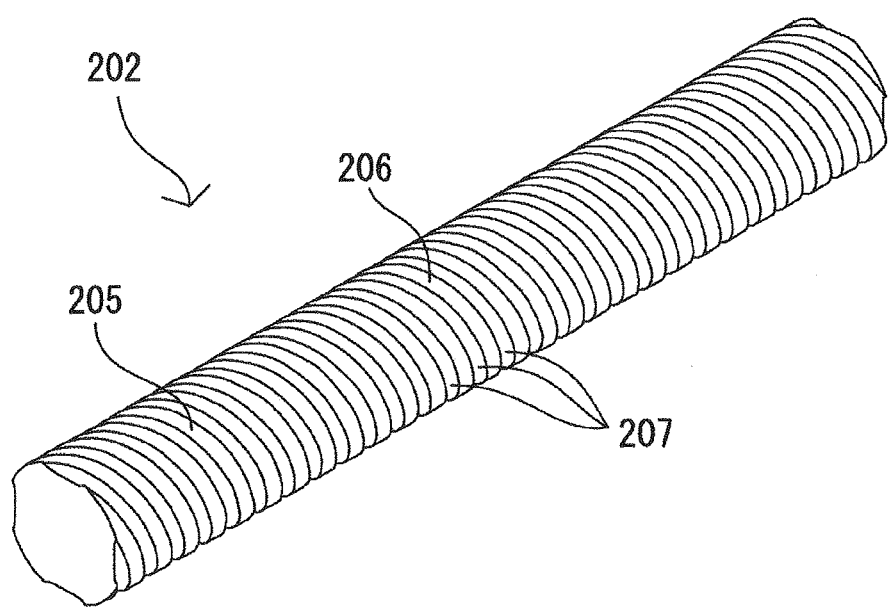
FIG. 13 depicts an example of perspective view of the male component of the ball screw in the third embodiment.

The male component (202) is metallic and, as shown in FIG. 13, has a rod-shaped main body part (205) and a plurality of male grooves (207) formed in a spiral manner on the outer periphery (206) of the main body part (205).

Figure 14:
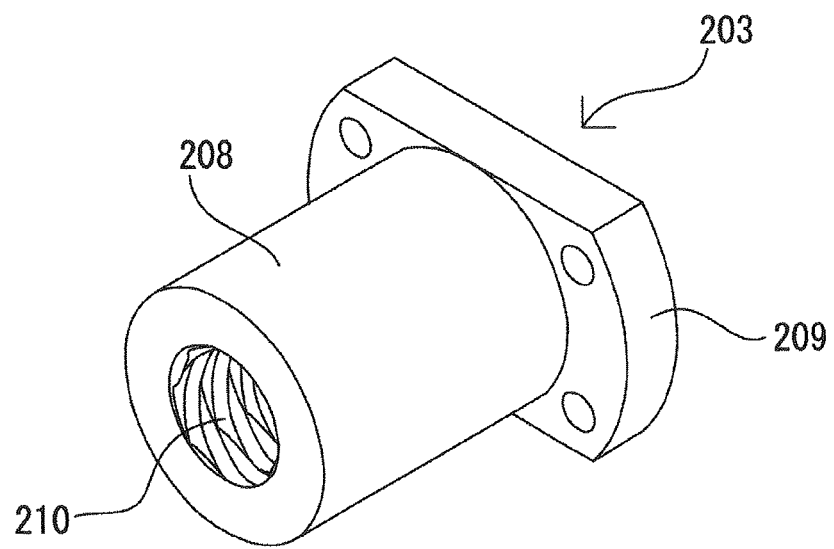
FIG. 14 depicts an example of perspective view of the female component of the ball screw in the third embodiment.

The female component (203) is metallic and, as shown in FIG. 14, has a cylindrical part (208) in a cylindrical shape, and a platy part (209) in a platy shape formed on an end of the cylindrical part (208). The cylindrical part (208) and the platy part (209) are integrally molded. As shown in FIG. 12, a plurality of female grooves (212) are formed on the inner peripheries (210, 211) of the cylindrical part (208) and the platy part (209). Each female groove (212) is spirally formed in a similar manner to each male groove (207), and formed at a position where the female groove (212) faces the male groove (207) of the male component (202) as shown in FIG. 12. Further, as shown in FIG. 12, circulation paths (213), through which a plurality of balls B2 can circulate, are formed inside the cylindrical part (208), and paths P2 capable of communicating with the circulation paths (213) are formed between the male grooves (207) and the female grooves (212). The paths P2 are filled with the plurality of balls B2.

The ball screw (201) in this embodiment is configured as an endless circulation path such that the relative rotation of the male and female components (202, 203) allows the balls B2 to roll through the paths P2 and thereafter return to an original position through the circulation paths (213). Such circulation of the balls B2 is performed in a repetitive manner, which enables the male and female components (202, 203) to shift in a relative manner in an axial direction while being fitted together. The male grooves (207) in this embodiment are formed in a four thread screw structure. In other words, the number of threads with respect to the grooves is four, and therefore four circulation paths (213) are formed accordingly.

As shown in FIG. 12, each of the seal members (204) includes a fiber layer (214), a rubber layer or resin layer (first rubber layer or resin layer) (215), a cover member (216), and a rubber layer or resin layer (second rubber layer or resin layer) (217). Hereinafter, it is to be noted that the first rubber layer or resin layer (215) will be referred to as "resin layer (215)" in an abbreviated manner, and that the second rubber or resin layer (217) will be referred to as "resin layer (217)" in an abbreviated manner.

The fiber layer (214) may be made of, e.g., aramid fiber, nylon, urethane, cotton, silk, linen, acetate, rayon, fluorine-containing fiber, polyester, or the like, which are impregnated with rubber or resin. The fiber layer (214) may be made of e.g., short fibers and long fibers.

By virtue of impregnating fibers with rubber or resin, rubber material or resin material is enabled to penetrate into the gaps within the fibers, and to serve as fiber layer (214) so as to bond these fibers. Further, by virtue of impregnating fibers with rubber and the like, the wear caused by friction between the fibers can be reduced, and still further, the resistance to wear on the fiber layer (214) caused by friction between the fiber layer (214) and male component (202) can be improved.

The rubber is required to be that with which the fibers can be impregnated. As such types of rubber, the followings may be used in a neat form or in a form denatured in various ways: e.g., urethane rubber, nitrile rubber, silicon rubber, fluororubber, acrylic rubber, ethylene-propylene rubber, butyl rubber, isoprene rubber, chlorinated polyethylene rubber, epichlorohydrin rubber, hydrogenated nitrile rubber, chloroprene rubber, polybutadiene rubber, styrene-butadiene rubber, natural rubber, and the like. Each of these types of rubber may be used alone, or a plurality of types of rubber selected therefrom may be used in a blended form. Further, the rubber may contain appropriate amounts of traditional compounding ingredients for rubber, such as vulcanizing agent, vulcanizing accelerator, antioxidant, softener, plasticizer, filler, colorant, and the like as well as solid lubricants such as graphite, silicone oil, fluorine powder, molybdenum disulfide, or the like for enhancing the lubricity of the fiber layer (214). Still further, the above types of rubber may be replaced by or combined with thermoplastic or thermosetting resin such as acrylic resin, polyester resin, urethane resin, vinyl chloride resin, polypropylene, polycarbonate, polyethylene terephthalate resin, fluorine resin, polyethylene, acrylonitrile-styrene resin, acrylonitrile-butadiene-styrene resin, polystyrene resin, polyvinyl chloride, polyvinylidene chloride, polyvinyl acetate, nylon, alkyd resin, phenolic resin, epoxy resin, polyphenylene sulfide resin, and the like.

When impregnating fibers with rubber or resin as described above, it is preferable that the rubber or resin be dissolved by a solvent or another means into a liquid state before dipping the predetermined fibers (short fibers, long fibers, fabric) in the liquid. The sheet-like fabric made of the fibers may be used as a precursor of the fiber layer (214). This fabric is impregnated with rubber or resin in the same way as mentioned above.

The fabric may be, e.g., non-woven fabric made of irregularly tangled fibers, regularly-formed woven, knitted fabric, or the like. These fabrics are characterized by facilitating impregnation (easier handling) with rubber and the like, and further facilitating adhesion to the surface of the cover member (216) in comparison with those made of fibers (short or long fibers) only, because these fabrics are in sheet form. The woven fabric may be made in a plain weave, satin weave, twill weave, or the like.

The fabric may preferably be stretchy to some extent. By virtue of such stretchiness, when the fabric is formed so as to be in line with the male grooves (207) in shape, there can be achieved the advantageous effects that: the surface of the fabric can easily be shaped in accordance with the form of the male grooves (207); and the fiber layer (214) has the surface subjected to few creases and uniformly finished, thereby enabling smooth fitting between the male component (202) and the seal members (204), and further enabling decrease in sliding resistance therebetween. By producing the fiber layer (214) of the fabric in such a manner that a stretchiness direction of the fabric in particular can coincide with at least a height direction (an axial direction of the ball screw) of the cylindrically-shaped fiber layer (214), it becomes possible that the surface of the fiber layer (214) is subjected to fewer creases.

As shown in FIG. 12, the fiber layer (214) has an inner periphery (inner surface of the fiber layer (214)) (214b), and such an inner periphery (214) has a convex part (214c) formed thereon and shaped in accordance with the form of the male grooves (207) of the male component (202). The convex part (214c) has a resin layer (217) (at least 50 μm thick) laminated on a surface thereof, and such a resin layer (217) is formed through steps that will be described later. This resin layer (217) is cured substance, but has some flexibility. Lamination is defined as application of resin or the like having relatively high viscosity, e.g., 1000 cps or above, to a material surface. As shown in FIG. 12, the fiber layer (214) has the inner periphery (214b) placed at the position surrounding the resin layer (217), and has the convex part (214c) formed on the inner periphery (214b). The convex part (214c) is a part capable of being fitted in the male grooves (207) of the male component (202) through the resin layer (217) when the male component is inserted into the inner periphery (214b).

Figure 15:
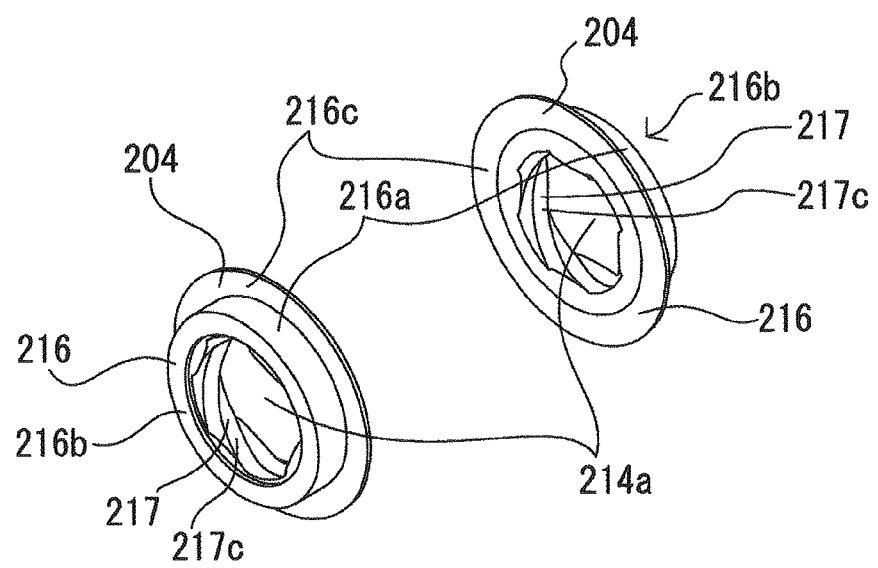
FIG. 15 depicts an example of perspective view of the seal members of the ball screw in the third embodiment.

The resin layer (217) has water or oil repellency. In order to express the function of water and/or oil repellency, the resin layer (217) may be made of rubber or resin containing at least one out of a group consisting of silicone resin, polytetrafluoroethylene, urethane resin, acrylic silicone resin, and fine particles thereof, or alternatively, the resin layer (217) may be made of silicone resin, polytetrafluoroethylene, urethane resin, or acrylic silicone resin in a neat form. Nitrile-butadiene rubber may be an example for the rubber or resin containing at least one out of silicone resin, polytetrafluoroethylene, urethane resin, acrylic silicone resin, and fine particles thereof. As a guide, the amount of the resin added in the rubber or resin to express the function of water and/or oil repellency is 5 wt % or more and less than 50 wt %, preferably 10 wt % or more and less than 30 wt %, with respect to 100 as the total amount of the rubber or resin. If the ingredient to express the function of water or oil repellency is too little in amount, the resin layer (217) does not effectively repel water or oil. On the other hand, if the ingredient is too large in amount, the resin layer (217) does not effectively adhere to the fiber layer (214) and is peels off from the fiber layer (214) during operations. The resin layer (217) having a predetermined thickness (at least 50 μm) is laminated on the inner periphery (214b) of the fiber layer (214) in accordance with the shape of the inner periphery (214b). Still further, the resin layer (217), as shown in FIG. 15, is a cylindrically-shaped thin layer having a hole (217a) defined therein. As shown in FIG. 12, the hole (217a) is configured such that it communicates with the inner peripheries (210, 211) of the female component (203). Still further, the resin layer (217) includes an inner periphery (inner surface of resin layer (217)) (217b) arranged at a position where it surrounds the hole (217a), and a convex part (217c) formed on the inner periphery (217b). The convex part (217c) is arranged on a region such that, when inserting the male component (202) into the hole (217a), the convex part (217c) can be fitted in the male grooves (207) of the male component (202) inserted into the hole (217a).

As the resin layer (215), e.g., urethane rubber, nitrile rubber, silicon rubber, fluororubber, acrylic rubber, ethylene-propylene rubber, butyl rubber, isoprene rubber, chlorinated polyethylene rubber, epichlorohydrin rubber, hydrogenated nitrile rubber, chloroprene rubber, polybutadiene rubber, styrene-butadiene rubber, natural rubber, and the like may be used in a neat form or in a form denatured in various ways, or alternatively, acrylic resin, polyester resin, urethane resin, vinyl chloride resin, polypropylene, polycarbonate, polyethylene terephthalate resin, fluorine resin, and the like may be used.

The resin layer (215) is a cylindrically-shaped layer having a hole defined therein, and the outer peripheral portion of the fiber layer (214) can be inserted into such a hole. As shown in FIG. 12, the resin layer (215) is laminated on a surface (214d) on a side opposite to an inner-periphery (214b)-formed side with respect to the fiber layer (214), where the inner-periphery (214b)-formed side is indicative of a side of the fiber layer (214) at which the inner periphery (214b) is formed.

A back-up ring may be installed on the outer peripheral portion of the resin layer (215) so as to apply inward pressure to the inner periphery (214b) of the fiber layer, thereby enabling improvements in the sealing property. The back-up ring, such as O-ring, garter spring, and the like, is configured to be capable of applying inward pressure to the inner periphery (214b) of the fiber layer, and it is preferable to select a type of back-up ring capable of generating inward pressure of proper magnitude optimized with respect to a balance between the sealing property and the slidability.

The cover member (216) is made of e.g., plastic or metal and, as shown in FIG. 15, includes a cylindrical part (216a), a ring part (216b), and a ring-shaped installation part (216c), all of which are integrally molded Further, the cover member (216) may be adhered to the fiber layer (214) or the resin layer (215) with adhesives: e.g., acrylic resin adhesive, olefin adhesive, urethane resin adhesive, ethylene-vinyl acetate resin adhesive, epoxy resin adhesive, vinyl chloride resin adhesive, chloroprene rubber adhesive, cyanoacrylate adhesive, silicon adhesive, styrene-butadiene rubber adhesive, nitrile rubber adhesive, hot-melt adhesive, phenolic resin adhesive, melamine resin adhesive, urea resin adhesive, resorcinol adhesive, or the like. There are methods to cure an adhesive for bonding: by heating an adhesive so as to cause the adhesive to melt as fluid, applying the melting adhesive, and thereafter cooling the applied adhesive; just by heating an adhesive; or the like. As possible surfaces to be bonded, e.g., contacting surfaces of the cylindrical part (216a) and the resin layer (215) of the cover member, contacting surfaces of the ring part (216b) and the resin layer (215) of the cover member, or the like may be considered.

As shown in FIG. 12, the cylindrical part (216a) is placed on the surface (215b) on a side opposite to the surface (215a) at a fiber-layer (214)-formed side with respect to the resin layer (215), where the fiber-layer (214)-formed side is indicative of a side of the resin layer (215) at which the fiber layer (214) is formed. As shown in FIG. 12, the ring part (216b) is placed at one end of the cylindrical part (216a), and is configured such that surfaces (214f, 215d) on a side opposite to the surfaces (214e, 215c) at a female-component (203)-formed side with respect to the fiber layer (214) and the resin layer (215), respectively, are covered by the ring part (216b), where the female-component (203)-formed side is indicative of a side of the fiber layer (214) and the resin layer (215) at which the female component (3) is formed As shown in FIG. 12, the installation part (216c) is placed at the other end of the cylindrical part (216a). The installation part (216c) is configured such that the fiber layer (214) and the resin layer (215) covered by the cylindrical part (216a) and the ring part (216b) can be installed by use of fastening components (not shown) at each of both ends of the female component (203) in an axial direction.

The cover member (216) shall not be limited to the above form but may be configured in other forms as long as such forms allow the installation thereof at an end of the female component (203) in an axial direction. As such other forms, e.g., the fiber layer (214) and the resin layer (215) can be installed by use of fastening components (not shown) at one end or each of both ends of the female component (203) in the axial direction in such a manner that these layers are fitted in a bore formed at one end or each of both ends of the female component (203) in the axial direction before a platy cover member having a hole for allowing the male component (202) to pass therethrough is adhered to a side surface of the resin layer (215).

If the fiber layer (214) and the resin layer (215) are fitted in the bore formed at one end or each of both ends of the female component (203) in the axial direction as mentioned above and thereafter fixation screws (not shown) are drive-fitted from the cylindrical part (208) or the outer peripheral portion of the platy part (209) of the female component (203) to the resin layer (215), there are cases where the cover member (216) may not be needed.

The seal members (204) may be manufactured by performing successively the steps of, in one example: bonding or coating one surface of sheet-like woven fabric impregnated with rubber or the like with resin having relatively high viscosity (resin of water and/or oil repellency after cured) and thereafter curing the sheet-like woven fabric having the one surface bonded or coated with the resin, and wrapping the cured sheet-like woven fabric around the outer periphery (206) of the male component (202) to form a precursor layer of the resin layer (217) and the fiber layer (214); wrapping a sheet of resin around the outer periphery of the precursor layer of the fiber layer (214) to form a precursor layer of the resin layer (215); applying pressure of proper magnitude on the outer periphery of the precursor layer of the resin layer (215) to form a convex part (214c) on the inner periphery of the precursor layer of the fiber layer (214); removing the precursor layers of the fiber layer (214) and the resin layer (215) from the male component (202) by rotating them in a circumferential direction of the male component (202); cutting the precursor layers of the fiber layer (214) and the resin layer (215) into doughnut-shaped pieces to make the fiber layer (214) and the resin layer (215) from each piece; and adhering the cover member (216) to the fiber layer (214) and the resin layer (215) with adhesive. Obviously, if no cover member is needed, the cover member adhering step is omitted.

(Features of Ball Screw of Third Embodiment)

According to the above construction, by virtue of making the fiber layer (214), which is fitted with the male grooves (207) of the male component (202), of woven fabric impregnated with rubber or the like, there can be simultaneously accomplished the reduction of the entry of fine foreign substances between the male and female components (202, 203) as well as the reduction of the sliding resistance therebetween when shifting them in a relative manner in an axial direction, both of which reductions as two problems are trade-off related to each other. Further, the fiber layer (214) impregnated with rubber or the like can improve the resistance to wear on the surface of the fiber layer (214) caused by friction generated between the fiber layer (214) and the male component (202). Still further, by laminating the resin layer (215) for reinforcing the fiber layer (214) on the surface (214d) opposite to the surface (214b) on which a hole (214a) is formed with respect to the fiber layer (214), the fiber layer (214) and the resin layer (215) can be stably fixed to the female component (203) at both ends thereof through the use of the cover member (216). Further, by virtue of forming the rubber or resin layer (217) of water or oil repellency, the entry of dust, grease, oil, and the like into the fiber layer (214) can be prevented, and therefore the degradation of the fiber layer (214) can be reduced. Still further, since the surface friction coefficient of the resin layer (217) is lower than the previous one, it is unlikely that the sliding wear between the male component (202) and the seal members (204) is generated, thereby improving the durability of the seal members (204), i.e., increasing the life of the seal members (204), and eventually increasing the life of the ball screw (201).

Specific constructions according to the present invention are not limited to embodiments described above with reference to the drawings. The scope of the present invention is not encompassed by the above explanations of embodiments but particularly pointed out by the claims, and the equivalents of the claim recitations as well as all the modifications within the scope of the claims fall within the scope of the present invention.

For example, in embodiments, there is described an example of arranging a pair of seal members (204) at both ends of the female component (203), respectively, in the axial direction; however, the present invention shall not be limited to such an example, and a seal member (204) may be arranged at any one of the two ends of the female component (203) in the axial direction, in accordance with the usage circumstances.

Embodiments show an example of male grooves (207) of a male component (202) having four thread screw structure, but the present invention shall not be limited to the example, and the number of threads of the male grooves (207) may be changed in accordance with the usage circumstances of the ball screw (201).

In embodiments, there is described an example of impregnating fibers of the fiber layer (214) with rubber or the like; however, the present invention shall not be limited to such an example, and sheet-like fabric made of fibers may be used for the fiber layer (214). For example, canvas, velvet, denim, woven fabric, knitted fabric impregnated with rubber or the like may be used. Horizontally and/or vertically stretchy fibers may also be used.

REFERENCE NUMERALS 1, 101, 201 Ball screw
2, 102, 202 Male component
3, 103, 203 Female component
4, 104, 204 Seal member
5, 105, 205 Main body part 6, 106, 206 Outer periphery
7, 107, 207 Male groove
8, 108, 208 Cylindrical part
9, 109, 209 Platy part
10, 11, 110, 111, 210, 211 Inner periphery
12, 112, 212 Female groove
13, 113, 213 Circulation path
14, 114, 214 Fiber layer
14a, 114a, 214a Hole
14b, 114b, 214b Inner periphery (fitting surface)
14c, 114c, 214c Convex part
14d-14f, 15a-15d, 114d-114f, 115a-115d, 214d-214f, 215a-215d Surface
15, 115, 215, 217 Resin layer (rubber layer)
16, 116, 216 Cover member
16a, 116a, 216a Cylindrical part
16b, 116b, 216b Ring part
16c, 116c, 216c Installation part
217b Inner periphery (inner surface of the resin layer 217)
B, B1, B2 Ball
P, P1, P2 Circulation path The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A ball screw comprising:
    a male component having a plurality of male grooves formed on an outer periphery thereof such that a ball is allowed to roll in the plurality of male grooves;
    a female component having a plurality of female grooves facing the plurality of male grooves formed on an inner periphery thereof such that the ball is allowed to roll in the plurality of female grooves, and having a circulation path formed therein such that the ball is allowed to circulate through the circulation path; and
    a seal member arranged at one end, at the other end, or at each of one and the other ends of the female component in an axial direction, wherein
    the male and female components are fitted together in the axial direction, and wherein
    the seal member includes
    a hole capable of communicating with the inner periphery of the female component,
    a fiber layer having a fitting surface formed with a convex part capable of being fitted in the plurality of male grooves of the male component when the male component is inserted into the hole, the fitting surface having at least a surface made of fibers impregnated with at least one of rubber and resin, and
    a layer of at least one of rubber and resin positioned radially outside the fiber layer and laminated on a surface opposite to the fitting surface of the fiber layer when the ball screw is assembled.

2. The ball screw of claim 1 wherein:
    a length of the fitting surface in the axial direction is shorter than or equal to pitch width of the plurality of male grooves of the male component.

3. The ball screw according to claim 2 wherein, at said one end, at said the other end, or at said each of one and the other ends of the female component in the axial direction, a plurality of seal members, as the seal member, are arranged coaxially in series in a continuous manner.

4. The ball screw according to claim 1 wherein:
    the fiber layer having a fitting surface comprises a sheet-like fabric of fibers formed on the male component, the fabric of fibers being impregnated with the at least one of rubber and resin, the fabric having a stretchiness in a direction coinciding with an axial direction of the male component.

5. The ball screw according to claim 1, further comprising:
    a cover member at least partially encapsulating the seal member, a portion of the cover member being positioned radially outside of both the fiber layer and the layer of at least one of rubber and resin.

6. A ball screw comprising:
    a male component having a plurality of male grooves formed on an outer periphery thereof such that a ball is allowed to roll in the plurality of male grooves;
    a female component having a plurality of female grooves facing the plurality of male grooves formed on an inner periphery thereof such that the ball is allowed to roll in the plurality of female grooves, and having a circulation path formed therein such that the ball is allowed to circulate through the circulation path; and
    a seal member arranged at one end, at the other end, or at each of one and the other ends of the female component in an axial direction, wherein
    the male and female components are fitted together in the axial direction, and wherein
    the seal member includes
    a hole capable of communicating with the inner periphery of the female component,
    a fiber layer configured such that the fiber layer can be fitted with the plurality of male grooves of the male component when the male component is inserted into the hole, the fiber layer having at least one surface made of fibers impregnated with rubber or resin,
    a first rubber or resin layer laminated on a surface opposite to the at least one surface of the fiber layer, and
    a second rubber or resin layer of water and/or oil repellency laminated with a predetermined thickness on the at least one surface of the fiber layer.

7. A seal structure applied to a ball screw characterized in that
    a male component of the ball screw having a plurality of male grooves formed on an outer periphery thereof such that a ball is allowed to roll in the plurality of male grooves, and
    a female component of the ball screw having a plurality of female grooves facing the plurality of male grooves formed on an inner periphery thereof such that the ball is allowed to roll in the plurality of female grooves, and having a circulation path formed therein such that the ball is allowed to circulate through the circulation path,
are fitted together in an axial direction, and that
the seal structure comprises:
a hole capable of communicating with the inner periphery of the female component;
a fiber layer configured such that the fiber layer can be fitted with the plurality of male grooves of the male component when the male component is inserted into the hole, the fiber layer having at least one surface made of fibers impregnated with rubber or resin; and
a rubber or resin layer of water and/or oil repellency laminated with a predetermined thickness on the at least one surface of the fiber layer.

8. A seal member used for a ball screw characterized in that
a male component of the ball screw having a plurality of male grooves formed on an outer periphery thereof such that a ball is allowed to roll in the plurality of male grooves, and
a female component of the ball screw having a plurality of female grooves facing the plurality of male grooves formed on an inner periphery thereof such that the ball is allowed to roll in the plurality of female grooves, and having a circulation path formed therein such that the ball is allowed to circulate through the circulation path,
are fitted together in an axial direction, and that
the seal member comprises:
a hole capable of communicating with the inner periphery of the female component;
a fiber layer configured such that the fiber layer can be fitted with the plurality of male grooves of the male component when the male component is inserted into the hole, the fiber layer having at least one surface made of fibers impregnated with rubber or resin;
a first rubber or resin layer laminated on a surface opposite to the at least one surface of the fiber layer; and
a second rubber or resin layer of water and/or oil repellency laminated with a predetermined thickness on the at least one surface of the fiber layer.

9. A seal structure applied to a ball screw characterized in that
a male component of the ball screw having a plurality of male grooves formed on an outer periphery thereof such that a ball is allowed to roll in the plurality of male grooves, and
a female component of the ball screw having a plurality of female grooves facing the plurality of male grooves formed on an inner periphery thereof such that the ball is allowed to roll in the plurality of female grooves, and having a circulation path formed therein such that the ball is allowed to circulate through the circulation path,
are fitted together in an axial direction, and that
the seal structure comprises:
a hole capable of communicating with the inner periphery of the female component; and
a fiber layer having a fitting surface formed with a convex part capable of being fitted in the plurality of male grooves of the male component when the male component is inserted into the hole, the fitting surface having at least a surface made of fibers impregnated with at least one of rubber and resin.

10. The seal structure of claim 9 wherein:
a length of the fitting surface in the axial direction is shorter than or equal to a pitch width of the plurality of male grooves of the male component.

11. The seal structure according to claim 10 wherein a plurality of seal structures, as the seal structure, are configured coaxially in series in a repetitive manner.

12. The seal structure according to claim 9 wherein:
the fiber layer having a fitting surface comprises a sheet-like fabric of fibers formed on the male component, the fabric of fibers being impregnated with the at least one of rubber and resin, the fabric having a stretchiness in a direction coinciding with an axial direction of the male component when being used for the ball screw.

13. A seal member used for a ball screw characterized in that
a male component of the ball screw having a plurality of male grooves formed on an outer periphery thereof such that a ball is allowed to roll in the plurality of male grooves, and
a female component of the ball screw having a plurality of female grooves facing the plurality of male grooves formed on an inner periphery thereof such that the ball is allowed to roll in the plurality of female grooves, and having a circulation path formed therein such that the ball is allowed to circulate through the circulation path,
are fitted together in an axial direction, and that
the seal member comprises:
a hole capable of communicating with the inner periphery of the female component;
a fiber layer having a fitting surface formed with a convex part capable of being fitted in the plurality of male grooves of the male component when the male component is inserted into the hole, the fitting surface having at least a surface made of fibers impregnated with at least one of rubber and resin; and
a layer of at least one of rubber and resin positioned radially outside the fiber layer and laminated on a surface opposite the fitting surface of the fiber layer when the ball screw is assembled.

14. The seal member according to claim 13 wherein:
the fiber layer having a fitting surface comprises a sheet-like fabric of fibers formed on the male component, the fabric of fibers being impregnated with the at least one of rubber and resin, the fabric having a stretchiness in a direction coinciding with an axial direction of the male component when being used for the ball screw.

15. The seal member according to claim 13, further comprising:
a cover member, a portion of the cover member being positioned radially outside of both the fiber layer and the layer of at least one of rubber and resin.

16. The seal member of claim 13 wherein:
a length of the fitting surface in the axial direction is shorter than or equal to a pitch width of the plurality of male grooves of the male component.

17. The seal member according to claim 16 wherein a plurality of seal members, as the seal member, are arranged coaxially in series in a continuous manner.

* * * * *